United States Patent
Masuda et al.

(10) Patent No.: US 8,282,456 B2
(45) Date of Patent: *Oct. 9, 2012

(54) GAMING MACHINE, GAMING METHOD, AND GAMING PROGRAM

(75) Inventors: Hiroyuki Masuda, Kobe (JP); Mitsuhiro Nozaki, Kobe (JP); Yoshito Fukuda, Kobe (JP); Masanori Kono, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 284 days.

This patent is subject to a terminal disclaimer.

(21) Appl. No.: 12/755,196

(22) Filed: Apr. 6, 2010

(65) Prior Publication Data

US 2010/0197381 A1    Aug. 5, 2010

Related U.S. Application Data

(63) Continuation of application No. PCT/JP2008/067702, filed on Sep. 30, 2008.

(30) Foreign Application Priority Data

Oct. 9, 2007   (JP) ................................ 2007-263128

(51) Int. Cl.
     *A63F 9/24*      (2006.01)
(52) U.S. Cl. ......... 463/7; 463/1; 463/9; 463/23; 463/30; 463/31; 463/36; 463/37
(58) Field of Classification Search ................. 463/7, 9, 463/23, 30, 31, 36, 37, 1
See application file for complete search history.

(56) References Cited

U.S. PATENT DOCUMENTS

| 4,207,087 A * | 6/1980 | Morrison et al. ................. 463/9 |
| 4,930,074 A * | 5/1990 | McCarthy ........................ 463/31 |
| 5,411,271 A * | 5/1995 | Mirando .......................... 463/9 |
| 6,325,715 B1 * | 12/2001 | Nagata ............................. 463/5 |
| 6,379,244 B1 | 4/2002 | Sagawa et al. |

(Continued)

FOREIGN PATENT DOCUMENTS

JP      2000-350861 A     12/2000

(Continued)

OTHER PUBLICATIONS

Notice of Rejection of the corresponding Japanese Application No. 2009-536978, Dated Jun. 7, 2011.

(Continued)

*Primary Examiner* — David L Lewis
*Assistant Examiner* — Chase Leichliter
(74) *Attorney, Agent, or Firm* — Global IP Counselors, LLP

(57) ABSTRACT

A gaming machine is provided which includes: an operation sequence table 211 storing an operation sequence in which one or more groups of time-series input timings are associated with operation means to be operated for input by a player based on the group of the input timings; operation instructing means 202 that outputs an operation instruction based on the operation sequence; evaluation means 205 that evaluates a game score based on comparison between the input timings and an operation timings; a criterion table 212 storing a criterion for determining a master level of the player; a master level determining means 203 that determines a master level of the player based on the criterion; and operation sequence changing means 204 that changes a part of at least one group of input timings, in the case where the player has a master level equal to or more than a predetermined value.

11 Claims, 17 Drawing Sheets

U.S. PATENT DOCUMENTS

| | | | |
|---|---|---|---|
| 6,461,239 B1 | 10/2002 | Sagawa et al. | |
| 6,607,446 B1 * | 8/2003 | Shimomura et al. | 463/43 |
| 6,620,042 B1 * | 9/2003 | Nagata | 463/5 |
| 6,638,160 B2 * | 10/2003 | Yoshitomi | 463/7 |
| 6,913,536 B2 * | 7/2005 | Tomizawa et al. | 463/43 |
| 7,060,000 B2 * | 6/2006 | Carlson | 482/1 |
| 7,628,699 B2 * | 12/2009 | Onoda et al. | 463/36 |
| 8,088,003 B1 * | 1/2012 | Bickerton et al. | 463/30 |
| 2005/0101364 A1 * | 5/2005 | Onoda et al. | 463/7 |
| 2006/0287088 A1 * | 12/2006 | Mashimo et al. | 463/37 |
| 2008/0146312 A1 | 6/2008 | Yamazaki et al. | |
| 2008/0192300 A1 * | 8/2008 | Kenji | 358/3.29 |
| 2008/0293470 A1 * | 11/2008 | Proud et al. | 463/9 |
| 2009/0131169 A1 | 5/2009 | Tamura et al. | |

FOREIGN PATENT DOCUMENTS

| | | |
|---|---|---|
| JP | 2001-170354 A | 6/2001 |
| JP | 2001-198360 A | 7/2001 |
| JP | 2007-181650 A | 7/2007 |
| TW | 200635643 | 10/2008 |
| WO | WO-2005/113096 A1 | 12/2005 |
| WO | WO-2006/112087 A1 | 10/2006 |

OTHER PUBLICATIONS

The Taiwanese Office Action in corresponding Taiwanese Application No. 097138555, dated Nov. 18, 2011.
The Extended European search report of the corresponding European Application No. 08837096.0, dated Feb. 24, 2012.
PCT/ISA/210 of International Application No. PCT/JP2008/067702, dated Dec. 9, 2008.
The Chinese Office Action in corresponding Chinese Application No. 200880105490.4, dated Feb. 22, 2012.

* cited by examiner

| PLAYER ID | PLAYER NAME | CARD ID | OPERATION SEQUENCE ID | THE NUMBER OF PLAYS | GAME SCORE |
|---|---|---|---|---|---|
| P0001 | YAMADA TARO | C0001 | S0001 | 3 | (30, 50, 65) |
| | | | S0002 | 7 | (15, 20, 25, 40, 65, 60, 85) |
| | | | S0003 | 0 | (--) |
| | | | S0004 | 1 | (50) |
| | | | ⋮ | ⋮ | ⋮ |
| P0002 | SUZUKI JIRO | C0002 | S0001 | 2 | (55, 70) |
| | | | S0002 | 0 | (--) |
| | | | S0003 | 3 | (45, 60, 55) |
| | | | ⋮ | ⋮ | ⋮ |
| ⋮ | ⋮ | ⋮ | ⋮ | ⋮ | ⋮ |

| 5 | 6 | 7 | 8 |
|---|---|---|---|
| 16 | 1 | 2 | 9 |
| 15 | 3 | 4 | 10 |
| 14 | 13 | 12 | 11 |

(b)

| ZONE | TIME | OPERATION UNIT NUMBER | | | | | | | CHANGE FLAG |
|---|---|---|---|---|---|---|---|---|---|
| | | ... | NO5 | ... | NO13 | NO14 | NO15 | NO16 | |
| A | t0 | ... | 0 | ... | 0 | 0 | 1 | 0 | 0 |
| | t1 | ... | 1 | ... | 0 | 0 | 0 | 1 | 0 |
| | t2 | ... | 0 | ... | 0 | 0 | 0 | 0 | 0 |
| | t3 | ... | 0 | ... | 1 | 1 | 0 | 1 | 0 |
| | t4 | ... | 0 | ... | 0 | 0 | 0 | 0 | 0 |
| | t5 | ... | 1 | ... | 1 | 1 | 1 | 0 | 0 |
| | t6 | ... | 0 | ... | 0 | 0 | 0 | 1 | 0 |
| | t7 | ... | 0 | ... | 1 | 1 | 0 | 0 | 0 |
| | t8 | ... | 0 | ... | 0 | 0 | 1 | 0 | 0 |
| | t9 | ... | 0 | ... | 1 | 1 | 0 | 0 | 1 |
| B | t10 | ... | 1 | ... | 0 | 0 | 0 | 0 | 0 |
| | t11 | ... | 1 | ... | 0 | 0 | 0 | 0 | 0 |
| | t12 | ... | 0 | ... | 0 | 0 | 0 | 1 | 0 |
| | t13 | ... | 0 | ... | 0 | 0 | 0 | 1 | 0 |
| | t14 | ... | 0 | ... | 0 | 0 | 1 | 0 | 0 |
| | t15 | ... | 0 | ... | 0 | 0 | 1 | 0 | 0 |
| | t16 | ... | 0 | ... | 0 | 1 | 0 | 0 | 0 |
| | t17 | ... | 0 | ... | 0 | 1 | 0 | 0 | 0 |
| | t18 | ... | 0 | ... | 0 | 0 | 0 | 0 | 0 |
| | t19 | ... | 0 | ... | 0 | 0 | 0 | 0 | 1 |
| . | . | . | . | . | . | . | ... | . | . |
| . | . | . | . | . | . | . | ... | . | . |

↑ INPUT TIMING GROUP

FIG. 6

| MASTER LEVEL | GAME SCORE (1 GAME) |
|---|---|
| 1 | 0 ~ 20 |
| 2 | 21 ~ 40 |
| 3 | 41 ~ 60 |
| 4 | 61 ~ 80 |
| 5 | 81 ~ 100 |

FIG. 7

| MASTER LEVEL | THE NUMBER OF PLAYS |
|---|---|
| 1 | 0 ~ 2 |
| 2 | 3 ~ 4 |
| 3 | 5 ~ 6 |
| 4 | 7 ~ 8 |
| 5 | 9 ~ |

START  END (b)

| MASTER LEVEL | GAME SCORE (ZONE) |
|---|---|
| 1 | 0 ~ 5 |
| 2 | 6 ~ 10 |
| 3 | 11 ~ 15 |
| 4 | 16 ~ 20 |
| 5 | 21 ~ 25 |

| CHANGE PATTERN ID | DETAILS OF CHANGE PATTERN |
|---|---|
| PT0001 | t(x0) ~ t(x9), NO1 → NO2 |
| PT0002 | t(x0) ~ t(x9), NO1 → NO2, NO2 → NO1 |
| PT0003 | t(x0) ~ t(x9), NO3 → NO4 |
| PT0004 | t(x0) ~ t(x9), NO3 → NO4, NO4 → NO3 |
| ⋮ | ⋮ |
| PT0010 | t(x2) ~ t(x8), NO1 → NO2 |
| PT0011 | t(x2) ~ t(x8), NO1 → NO2, NO2 → NO1 |
| ⋮ | ⋮ |

FIG. 10

| DIFFICULTY LEVEL | OPERATION SEQUENCE ID |
|---|---|
| 1 | S0001 |
| 2 | S0002 |
| 3 | S0003 |
| ⋮ | ⋮ |

CHANGE ACCORDING TO PT0004

(a) BEFORE CHANGE

| ZONE | TIME | OPERATION UNIT NUMBER | | | | | | | | CHANGE FLAG |
|---|---|---|---|---|---|---|---|---|---|---|
| | | NO1 | NO2 | NO3 | NO4 | ... | NO14 | NO15 | NO16 | |
| A | t0 | 0 | 0 | 1 | 0 | ... | 0 | 1 | 0 | 0 |
| | t1 | 0 | 1 | 0 | 0 | ... | 1 | 0 | 1 | 0 |
| | t2 | 0 | 0 | 0 | 0 | ... | 0 | 0 | 0 | 0 |
| | t3 | 1 | 0 | 0 | 1 | ... | 0 | 0 | 1 | 0 |
| | t4 | 0 | 0 | 1 | 0 | ... | 0 | 0 | 0 | 0 |
| | t5 | 1 | 1 | 0 | 1 | ... | 1 | 1 | 0 | 0 |
| | t6 | 0 | 0 | 0 | 0 | ... | 0 | 0 | 1 | 0 |
| | t7 | 1 | 0 | 0 | 1 | ... | 0 | 0 | 0 | 0 |
| | t8 | 0 | 0 | 0 | 0 | ... | 0 | 1 | 0 | 0 |
| | t9 | 1 | 0 | 0 | 1 | ... | 0 | 0 | 0 | 1 |
| B | t10 | 0 | 0 | 1 | 0 | ... | 0 | 0 | 0 | 0 |
| | t11 | 0 | 1 | 0 | 0 | ... | 1 | 1 | 0 | 0 |
| | t12 | 0 | 0 | 1 | 0 | ... | 0 | 0 | 1 | 0 |
| | t13 | 0 | 0 | 0 | 0 | ... | 0 | 1 | 0 | 0 |
| | t14 | 0 | 1 | 0 | 0 | ... | 1 | 0 | 0 | 0 |
| | t15 | 1 | 0 | 0 | 1 | ... | 0 | 0 | 0 | 0 |
| | t16 | 0 | 0 | 1 | 0 | ... | 0 | 0 | 0 | 0 |
| | t17 | 0 | 0 | 1 | 0 | ... | 0 | 0 | 0 | 0 |
| | t18 | 1 | 0 | 0 | 1 | ... | 0 | 1 | 0 | 0 |
| | t19 | 0 | 0 | 0 | 0 | ... | 0 | 0 | 1 | 1 |
| . | . | . | . | . | . | ... | . | . | . | . |

(b) AFTER CHANGE

| ZONE | TIME | OPERATION UNIT NUMBER | | | | | | | | CHANGE FLAG |
|---|---|---|---|---|---|---|---|---|---|---|
| | | NO1 | NO2 | NO3 | NO4 | ... | NO14 | NO15 | NO16 | |
| A | t0 | 0 | 0 | 1 | 0 | ... | 0 | 1 | 0 | 0 |
| | t1 | 0 | 1 | 0 | 0 | ... | 1 | 0 | 1 | 0 |
| | t2 | 0 | 0 | 0 | 0 | ... | 0 | 0 | 0 | 0 |
| | t3 | 1 | 0 | 0 | 1 | ... | 0 | 0 | 1 | 0 |
| | t4 | 0 | 0 | 1 | 0 | ... | 0 | 0 | 0 | 0 |
| | t5 | 1 | 1 | 0 | 1 | ... | 1 | 1 | 0 | 0 |
| | t6 | 0 | 0 | 0 | 0 | ... | 0 | 0 | 1 | 0 |
| | t7 | 1 | 0 | 0 | 1 | ... | 0 | 0 | 0 | 0 |
| | t8 | 0 | 0 | 0 | 0 | ... | 0 | 1 | 0 | 0 |
| | t9 | 1 | 0 | 0 | 1 | ... | 0 | 0 | 0 | 1 |
| B | t10 | 0 | 0 | 0 | 1 | ... | 0 | 0 | 0 | 0 |
| | t11 | 0 | 1 | 0 | 0 | ... | 1 | 1 | 0 | 0 |
| | t12 | 0 | 0 | 0 | 1 | ... | 0 | 0 | 1 | 0 |
| | t13 | 0 | 0 | 0 | 0 | ... | 0 | 1 | 0 | 0 |
| | t14 | 0 | 1 | 0 | 0 | ... | 1 | 0 | 0 | 0 |
| | t15 | 1 | 0 | 1 | 0 | ... | 0 | 0 | 0 | 0 |
| | t16 | 0 | 0 | 0 | 1 | ... | 0 | 0 | 0 | 0 |
| | t17 | 0 | 0 | 0 | 1 | ... | 0 | 0 | 0 | 0 |
| | t18 | 1 | 0 | 1 | 0 | ... | 0 | 1 | 0 | 0 |
| | t19 | 0 | 0 | 0 | 0 | ... | 0 | 0 | 1 | 1 |
| . | . | . | . | . | . | ... | . | . | . | . |

(a)

ROUTINE SEQUENCE

| | NO5 | NO13 | NO14 | NO15 | NO16 |
|---|---|---|---|---|---|
| ta | 1 | 0 | 0 | 0 | 0 |
| tb | 1 | 0 | 0 | 0 | 0 |
| tc | 0 | 0 | 0 | 0 | 1 |
| td | 0 | 0 | 0 | 0 | 1 |
| te | 0 | 0 | 0 | 1 | 0 |
| tf | 0 | 0 | 0 | 1 | 0 |
| tg | 0 | 0 | 1 | 0 | 0 |
| th | 0 | 0 | 1 | 0 | 0 |

(b)

CHANGE PATTERN

| | NO5 | NO13 | NO14 | NO15 | NO16 |
|---|---|---|---|---|---|
| ta | 1 | 0 | 0 | 0 | 0 |
| tb | 1 | 0 | 0 | 0 | 0 |
| tc | 0 | 0 | 0 | 0 | 1 |
| td | 0 | 0 | 0 | 0 | 1 |
| te | 0 | 0 | 0 | 1 | 0 |
| tf | 0 | 0 | 0 | 1 | 0 |
| tg | 0 | 1 | 0 | 0 | 0 |
| th | 0 | 1 | 0 | 0 | 0 |

(a) BEFORE CHANGE

| ZONE | TIME | ... | NO5 | ... | NO13 | NO14 | NO15 | NO16 | CHANGE FLAG |
|---|---|---|---|---|---|---|---|---|---|
| A | t0 | ... | 0 | ... | 0 | 0 | 1 | 0 | 0 |
| A | t1 | ... | 1 | ... | 0 | 0 | 0 | 1 | 0 |
| A | t2 | ... | 0 | ... | 0 | 0 | 0 | 0 | 0 |
| A | t3 | ... | 0 | ... | 1 | 1 | 0 | 1 | 0 |
| A | t4 | ... | 0 | ... | 0 | 0 | 0 | 0 | 0 |
| A | t5 | ... | 1 | ... | 1 | 1 | 1 | 0 | 0 |
| A | t6 | ... | 0 | ... | 0 | 0 | 0 | 1 | 0 |
| A | t7 | ... | 0 | ... | 1 | 1 | 0 | 0 | 0 |
| A | t8 | ... | 0 | ... | 0 | 0 | 1 | 0 | 0 |
| A | t9 | ... | 0 | ... | 1 | 1 | 0 | 0 | 1 |
| B | t10 | ... | 1 | ... | 0 | 0 | 0 | 0 | 0 |
| B | t11 | ... | 1 | ... | 0 | 0 | 0 | 0 | 0 |
| B | t12 | ... | 0 | ... | 0 | 0 | 0 | 1 | 0 |
| B | t13 | ... | 0 | ... | 0 | 0 | 0 | 1 | 0 |
| B | t14 | ... | 0 | ... | 0 | 0 | 1 | 0 | 0 |
| B | t15 | ... | 0 | ... | 0 | 0 | 1 | 0 | 0 |
| B | t16 | ... | 0 | ... | 0 | 1 | 0 | 0 | 0 |
| B | t17 | ... | 0 | ... | 0 | 1 | 0 | 0 | 0 |
| B | t18 | ... | 0 | ... | 0 | 0 | 0 | 0 | 0 |
| B | t19 | ... | 0 | ... | 0 | 0 | 0 | 0 | 1 |
| . | . | ... | . | ... | . | . | . | . | . |
| . | . | ... | . | ... | . | ... | . | . | . |

(b) AFTER CHANGE

| ZONE | TIME | ... | NO5 | ... | NO13 | NO14 | NO15 | NO16 | CHANGE FLAG |
|---|---|---|---|---|---|---|---|---|---|
| A | t0 | ... | 0 | ... | 0 | 0 | 1 | 0 | 0 |
| A | t1 | ... | 1 | ... | 0 | 0 | 0 | 1 | 0 |
| A | t2 | ... | 0 | ... | 0 | 0 | 0 | 0 | 0 |
| A | t3 | ... | 0 | ... | 1 | 1 | 0 | 1 | 0 |
| A | t4 | ... | 0 | ... | 0 | 0 | 0 | 0 | 0 |
| A | t5 | ... | 1 | ... | 1 | 1 | 1 | 0 | 0 |
| A | t6 | ... | 0 | ... | 0 | 0 | 0 | 1 | 0 |
| A | t7 | ... | 0 | ... | 1 | 1 | 0 | 0 | 0 |
| A | t8 | ... | 0 | ... | 0 | 0 | 1 | 0 | 0 |
| A | t9 | ... | 0 | ... | 1 | 1 | 0 | 0 | 1 |
| B | t10 | ... | 1 | ... | 0 | 0 | 0 | 0 | 0 |
| B | t11 | ... | 1 | ... | 0 | 0 | 0 | 0 | 0 |
| B | t12 | ... | 0 | ... | 0 | 0 | 0 | 1 | 0 |
| B | t13 | ... | 0 | ... | 0 | 0 | 0 | 1 | 0 |
| B | t14 | ... | 0 | ... | 0 | 0 | 1 | 0 | 0 |
| B | t15 | ... | 0 | ... | 0 | 0 | 1 | 0 | 0 |
| B | t16 | ... | 0 | ... | 1 | 0 | 0 | 0 | 0 |
| B | t17 | ... | 0 | ... | 1 | 0 | 0 | 0 | 0 |
| B | t18 | ... | 0 | ... | 0 | 0 | 0 | 0 | 0 |
| B | t19 | ... | 0 | ... | 0 | 0 | 0 | 0 | 1 |
| . | . | ... | . | ... | . | . | . | . | . |
| . | . | ... | . | ... | . | . | . | . | . |

FIG. 18

| ROUTINE SEQUENCE ID | CHANGE PATTERN ID | CHANGE SEQUENCE ID (TIME) |
|---|---|---|
| F0001 | PT1001 | S0005 (t21~t28), S0010 (t52~t59) |
| F0002 | PT1002, PT1003 | S0007 (t32~t38), S0015 (t80~t86) |
| F0003 | PT1004 | S0011 (t41~t47) |
| ⋮ | ⋮ | ⋮ |

FIG. 19

| ZONE | TIME | OPERATION UNIT NUMBER | | | | | | | | ACHIEVEMENT LEVEL |
|---|---|---|---|---|---|---|---|---|---|---|
| | | 1 | 2 | 3 | 4 | ... | 14 | 15 | 16 | |
| A | t0 | 0 | 0 | poor | 0 | ... | 0 | perfect | 0 | 80% |
| | t1 | 0 | good | 0 | 0 | ... | perfect | 0 | good | |
| | t2 | 0 | 0 | 0 | 0 | ... | 0 | 0 | 0 | |
| | t3 | perfect | 0 | 0 | perfect | ... | 0 | 0 | good | |
| | t4 | 0 | 0 | great | 0 | ... | 0 | 0 | 0 | |
| | t5 | good | poor | 0 | perfect | ... | perfect | perfect | 0 | |
| | t6 | 0 | 0 | 0 | 0 | ... | 0 | 0 | perfect | |
| | t7 | good | 0 | 0 | good | ... | 0 | 0 | 0 | |
| | t8 | 0 | 0 | 0 | 0 | ... | 0 | perfect | 0 | |
| | t9 | poor | 0 | 0 | great | ... | 0 | 0 | 0 | |
| B | t10 | 0 | 0 | poor | 0 | ... | 0 | 0 | 0 | 20% |
| | t11 | 0 | great | 0 | 0 | ... | poor | perfect | 0 | |
| | t12 | 0 | 0 | great | 0 | ... | 0 | 0 | poor | |
| | t13 | 0 | 0 | 0 | 0 | ... | 0 | good | 0 | |
| | . | . | . | . | . | ... | . | . | . | |
| . | . | . | . | . | . | ... | . | . | . | |

FIG. 20

| MASTER LEVEL | CHANGE PATTERN ID | DETAILS OF CHANGE PATTERN |
|---|---|---|
| 1 | PT000A1 | t(x0) ~ t(x9), NO1 → NO2 |
| 2 | PT000A2 | t(x0) ~ t(x9), NO1 → NO2, NO2 → NO1 |
| 3 | PT000A3 | t(x0) ~ t(x9), NO1 → NO2, NO2 → NO1, NO3 → NO4 |
| : | : | : |

GAMING MACHINE, GAMING METHOD, AND GAMING PROGRAM

TECHNICAL FIELD

The present invention relates to a gaming machine, a gaming method, and a gaming program.

BACKGROUND ART

Gaming machines each have a program for progressing a game, and the program is used to provide operation instructions to a player. For example, music gaming machines each have a program called operation sequence incorporated therein. A music gaming machine indicates an operation member to be operated and an indicated timing to be operated on a monitor, based on the operation sequence. The music gaming machine then compares the timing when the indicated operation member was actually performed with the indicated timing to compute a game score. Players who have favorite songs or want to have a better game score repeatedly practice the game based on an identical operation sequence.

DISCLOSURE OF INVENTION

After the repeated practices of the game based on an identical operation sequence, some players remember a next operation member to be indicated to operate or a next timing to operate the operation member. Then, the players get bored of the game based on the memorized operation sequence, and lose the desire to challenge the game. Even if the game uses the players' favorite songs, the players are not willing to challenge the game.

The present invention is directed to provide a technology to maintain or increase players' willingness to challenge a game.

To solve the above problem, a first aspect of the present invention provides a gaming machine, comprising: a plurality of operation means that each accepts an input operation from a player; operation sequence storing means that stores an operation sequence in which one or more groups of a plurality of input timings are associated with operation means to be operated for input by the player based on the group of the input timings, each group setting the plurality of input timings in time series at each of which the player should perform an input operation using one of the operation means; operation instructing means that outputs an operation instruction including the operation means and the input timings for input operation, based on the operation sequence; evaluation means that evaluates a game score of the player based on comparison between the input timings and operation timings when the player performed the input operations using the operation means; criterion storing means that stores a criterion for determining a master level of the player; master level determining means that determines a master level of the player based on the criterion; and operation sequence changing means that changes a part of at least one group of input timings in the case where the player was determined to have a master level equal to or more than a predetermined value by the master level determining means.

A gaming machine according to the present invention progresses a game based on an operation sequence corresponding to a game selected by a player or an operation sequence selected for a master level of a player. In the case where a player has a master level equal to or more than a predetermined value, the player can be determined to be familiar with the on-going operation sequence and know next operation means and the input timing for input operation. Then, in the case where a player has a master level equal to or more than a predetermined value, a part of a group of input timings or a part of the operation sequence is changed. The part of the operation sequence may be any part thereof, like the beginning, end, or middle part thereof. A change in the operation sequence causes changes in the operation means and the input timing for input operation, and thereby even the game that is based on the operation sequence a player repeatedly played can provide fresh feeling for the game to the game for the player. The change in the operation sequence hinders the player from operating the operation means using his/her memory, which requires quick reaction of the player to the change, and increases sense of tension of the player to the game. As described above, according to the present invention, the change in an operation sequence provides fresh feeling and sense of tension to the game for a player, and enhances the interest to the game and willingness to challenge the game of the player.

A second aspect according to the present invention provides the gaming machine in the first aspect, wherein, in the part of at least one group of input timings, the operation sequence changing means changes the operation means that is associated with the group of input timings.

Assume that a group of input timings is set to three operation means of an R button, a G button, and a B button in an operation sequence for example. For example, in a part of the group of input timings associated with the G button, the operation means to be operated for input is changed from the G button to the R button. This provides feeling and sense of tension for a player fresh to the game the player repeatedly played based on the operation sequence. Alternatively, for example, in a part of the group of input timings associated with the G button and a part of the group of input timings associated with the R button, the operation means to be operated for input may be replaced with each other. In the replacement, the part of the group of input timings with the G button is overwritten with the part of the group of input timings with the R button in the operation sequence, and the part of the group of input timings with the R button is overwritten with the part of the group of input timings with the G button.

The detail of a change in an instruction sequence may be predetermined such as the replacement of the R button with the G button, or may be random. Even in the case where the details of a change in an operation sequence are predetermined, the operation sequence a player is familiar with is changed, and thereby fresh feeling and sense of tension can be provided to the player. In the case where an operation sequence is changed based on predetermined detail of a change, some players get used to the change. In contrast, with random changes in an operation sequence, a player can be provided with more fresh feeling and sense of tension than in the case with a predetermined change.

A third aspect according to the present invention provides the gaming machine in the first aspect, wherein the evaluation means extracts a mastered pattern of a matching degree that is equal to a predetermined value or more between the operation timings of the operation means by the player and the input timings, based on the game score of the past corresponding to the operation sequence, from the operation sequence, and the operation sequence changing means changes at least a part of the mastered pattern.

The mastered pattern is a part of a higher matching degree between an operation timing and an input timing in an operation sequence, and is the part a player is especially get used to. A change in the mastered pattern makes a coming operation instruction unpredictable for the player who is familiar with the input operation and could easily predict a next operation instruction. Accordingly, even the game that is based on the operation sequence a player repeatedly played can provide fresh feeling and sense of tension to the game for the player, and enhance the interest to the game and willingness to challenge the game of the player.

A fourth aspect according to the present invention provides the gaming machine in the first aspect, wherein at least a part of the operation means is arranged in a predetermined direction, and the operation sequence includes a routine sequence that requires for input operations using the operation means along the predetermined direction in time series, and, in a part of at least one group of the input timings in the routine sequence, the operation sequence changing means replaces the operation means associated with the group of input timings with operation means arranged in a direction different from the predetermined direction.

The "operation means is arranged in a predetermined direction" means that the operation means are arranged in a row direction and/or a column direction for example. For example, buttons as the operation means are arranged in four rows and four columns. In the routine sequence, operation instructions are output for the buttons at (row, column)=(1, 1), (2, 1), (3, 1), (4, 1) for example, in sequence in a predetermined directions. Such operation instruction based on the routine sequence allows a player to expect next operation means the player should operate for input. So, a part of the routine sequence is changed to make a next operation means to be operated for input unpredictable, and provide fresh feeling and sense of tension to the game for a player.

Because a player can predict next operation means the player should operate for input based on a former part of the routine sequence, and a latter part of the routine sequence is preferably changed: for example, the last operation instruction in the routine sequence is changed. For example, in the above routine sequence, the fourth button at (4, 1) is changed into a button at (4, 2) in a different column. Because the operation means instructed by the first to third operation instructions are in an identical column, a player easily predict the operation means instructed by the fourth operation instruction to be in the same column. But the operation means instructed by the fourth operation instruction is now in a different column from those of the operation means instructed by the first to third operation instructions as described above, the player cannot predict the next operation means to be operated for input.

A fifth aspect according to the present invention provides the gaming machine in the first aspect, wherein the operation sequence changing means varies the details of a change in the group of input timings depending on the master level of the player.

A player having a higher master level is more familiar with the operation instructions based on an operation sequence. Thus, for a player having a higher master level, the operation sequence changing means increases the timings for changing the place of the operation means to be operated for input, or increases a ratio of change in an operation sequence. Because an operation sequence is changed depending on a master level, a player can enjoy the play which is appropriate for his/her master level, with more fresh feeling and sense of tension to the game that is based on the operation sequence the player repeatedly played.

A sixth aspect according to the present invention provides the gaming machine in the first aspect, wherein the operation sequence changing means changes the part of the group of input timings after the operation instructions are implemented to a predetermined position of the operation sequence.

The "predetermined position of the operation sequence" means, in the case where the operation sequence is based on a song, a position where the tone of the song changes, a new phrase starts, or the song is resumed after an interlude, for example. Because the rhythm of the song obviously changes at such a predetermined position, a player easily responds to the change in the operation sequence. For example, when the evaluation means determines that a player has a master level of a predetermined value or more based on the game score for an operation sequence at the predetermined position, the operation sequence changing means changes the part of the group of input timings after the predetermined position.

Otherwise, the operation sequence changing means may change an operation sequence when a predetermined period of time has passed since the game starts, or randomly at any timing during the game. The random changes in the operation sequence provide sense of tension to the game for the player.

A seventh aspect according to the present invention provides the gaming machine in sixth aspect, wherein the master level determining means determines whether or not the master level to the predetermined position is equal to or more than a predetermined value.

The master level determining means determines a master level at the predetermined position, and partly or completely changes the group of input timings after the predetermined position. For example, the master level determining means determines a master level at a bar in a song, and partly or completely changes the operation sequence after the bar. This enables change in a part of the operation sequence based on the most recent master level before the change.

Otherwise, the master level determining means may determine a master level before the game starts, to partly or completely change an operation sequence at a predetermined position after the game starts or when a predetermined period of time has passed. The master level may be determined for every input operation, instead of based on the input operations to a predetermined position. When a master level becomes equal to or more than a predetermined value, the operation sequence after the time point is immediately changed partly or completely. In other words, the time-lag is eliminated between the time point of determination of the master level and the time point for change in the operation sequence. A player having a master level equal to or more than a predetermined value can be determined to get used to the on-going operation sequence, and thereby the operation sequence after the determination is immediately changed, so that fresh feeling and sense of tension to the game can be provided for the player.

An eighth aspect according to the present invention provides the gaming machine in sixth aspect, wherein the operation sequence storing means stores the predetermined position.

In the case where the operation sequence is based on a song, the operation sequence storing means stores the predetermined position according to a position where the tone of the song changes, a new phrase starts, or the song is resumed after an interlude, for example.

A ninth aspect according to the present invention provides the gaming machine in the first aspect, wherein the criterion of the master level is at least one of the number of plays based on the operation sequence, a game score of the past based on the operation sequence, and a current game score at a predetermined time point after the operation instruction starts based on the operation sequence.

With respect to a certain operation sequence, in the case where a player played the operation sequence a predetermined number of times or more, or the game score of the past for the operation sequence, or the current game score is equal to or more than a predetermined value, the player can be determined to know well the flow of the operation sequence and have a master level of a predetermined value or more. Accordingly, a change in the operation sequence based on the criteria provides fresh feeling and sense of tension to a player, instead of familiarity.

The above criteria may be combined together to determine a master level in total. For example, in the case of a player with a higher game score of the past and a lower current game score, the master level may be determined based on the current game score to decrease a ratio of change in the operation sequence.

A tenth aspect provides a gaming method executed by a gaming machine having a plurality of operation means that each accepts an input operation from a player, the method comprising it includes: an operation sequence storing step of storing an operation sequence in which one or more groups of a plurality of input timings are associated with operation means to be operated for input by the player based on the group of the input timings, each group setting the plurality of input timings in time series at each of which the player should perform an input operation using one of the operation means an operation instruction step of outputting an operation instruction containing the operation means and the input timing for input operation, based on the operation sequence; an evaluation step of evaluating a game score of the player based on comparison between the input timings and operation timings when the player performed the input operations using the operation means; a criterion storing step of storing a criterion for determining a master level of the player; a master level determining step of determining a master level of the player based on the criterion; and an operation sequence changing step of changing a part of at least one group of input timings, in the case where the master level of the player is determined to be equal to or more than a predetermined value in the master level determining step. This aspect provides advantages similar to those in the first aspect.

An eleventh aspect provides a gaming program executed by a computer terminal having a plurality of operation means that each accepts an input operation from a player, the program makes the computer terminal to be executed as: operation sequence storing means that stores an operation sequence in which one or more groups of a plurality of input timings are associated with operation means to be operated for input by the player based on the group of the input timings, each group setting the plurality of input timings in time series at each of which the player should perform an input operation using one of the operation means, operation instructing means that outputs an operation instruction containing the operation means and the input timing for input operation, based on the operation sequence; evaluation means that evaluates a game score of the player based on comparison between the input timings and operation timings when the player performed the input operations using the operation means; criterion storing means that stores a criterion for determining a master level of the player; master level determining means that determines a master level of the player based on the criterion; and operation sequence changing means that changes a part of at least one group of input timings, in the case where the master level of the player is determined to be equal to or more than a predetermined value by the master level determining means. This aspect provides advantages similar to those in the first aspect.

According to the present invention, a technology to maintain or increase players' willingness to challenge a game can be provided.

BRIEF DESCRIPTION OF DRAWINGS

FIG. 5 illustrates an example of personal data storing means.

FIG. 6(*a*) illustrates an example of an arrangement of operation units, and FIG. 6(*b*) illustrates examples of operation sequences.

FIG. 7 illustrates an example of a criterion table.

FIG. 8 illustrates another example of a criterion table.

FIG. 10 illustrates an example of change pattern storing means.

FIG. 16(*a*) illustrates a routine sequence, and FIG. 16(*b*) illustrates a sequence showing a changed pattern.

FIG. 17 illustrates an example of a change in an operation sequence.

FIG. 18 illustrates an example of a table stored in change pattern storing means in a first modified embodiment.

FIG. 19 is a list of matching degrees between operation timings of the operation units 114 and input timings defined by operation sequences.

FIG. 20 illustrates an example of table of master levels stored in a change pattern storing means 213, each level associated with a changed pattern ID and details of a change.

Figure 1:
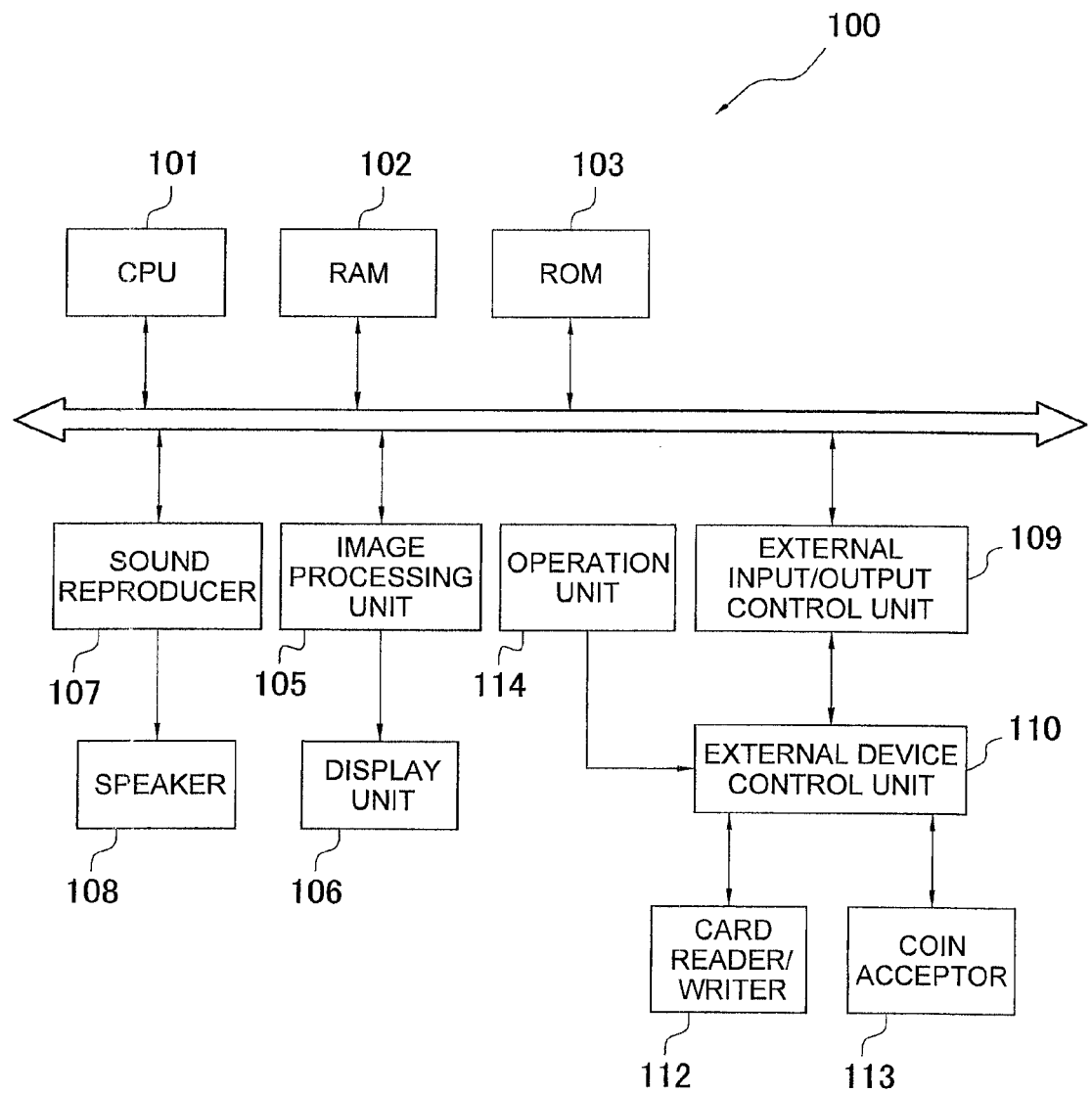
FIG. 1 illustrates an example a configuration of a gaming machine terminal 100.

EXPLANATION OF REFERENCE 100 gaming machine terminal
101 CPU
102 RAM
103 ROM
106 display unit
114 operation unit
201 game controlling means
202 operation instructing means
203 master level determining means
204 operation sequence changing means
205 evaluation means
211 operation sequence table
212 criterion table
213 change pattern storing means
214 association table
215 personal data storing means

BEST MODE FOR CARRYING OUT THE INVENTION

<First Embodiment>

(1) Gaming Machine Terminal According to the Present Embodiment

FIG. 1 illustrates an example of a configuration of a gaming machine terminal 100. The gaming machine terminal 100 includes the following components (a) to (n).

(a) CPU 101: for achieving a plurality of functions described below, based on a control program or game data stored in an ROM 203 described below.

(b) RAM 102: for temporarily storing various game data such as different variables and parameters.

(c) ROM 103: for storing control programs and various parameters (d) Speaker 108: for outputting sound such as sound effects during a game, when a demonstration screen is displayed, when a game score is displayed, or the like.

(e) Sound Reproducer 107: for generating sound data to be outputted to the speaker 108.

(f) Monitor 106: for displaying operation instructions, decorative lights during a game, a game score, demonstration screen, and the like. The operation instruction indicates an operation unit 114 to be operated for an input operation and the input timing.

(g) Operation Units 114: one or more press-type switches are provided on the display unit 106 as one or more operation units 114. The operation units 114 are made of a material that allows the display surface of the display unit 106 to be seen through the operation units 114. The operation units 114 also function as various buttons for selection and determination of a difficulty level of the game for example.

(h) Image Processing Unit 105: for generating image data to be displayed on the display unit 106.

(i) Card Reader/Writer 112: for reading a card ID of a magnetic card inserted therein. The card reader/writer 112 may perform a process for writing a player ID or a game score as needed.

(j) Coin Acceptor 113: for accepting a credit by coins inserted therein.

(k) External Device Control Unit 110: for controlling to accept various inputs from external devices such as the card reader/writer 112, the coin acceptor 113, and the operation units 114.

(l) External Input/Output Control Unit 109: for generating control signals to external devices such as the card reader/writer 112, the coin acceptor 113, and the operation units 114. Also, the external input/output control unit 109 receives detection signals from external devices, and sends the signals to the CPU 101.

Figure 2:
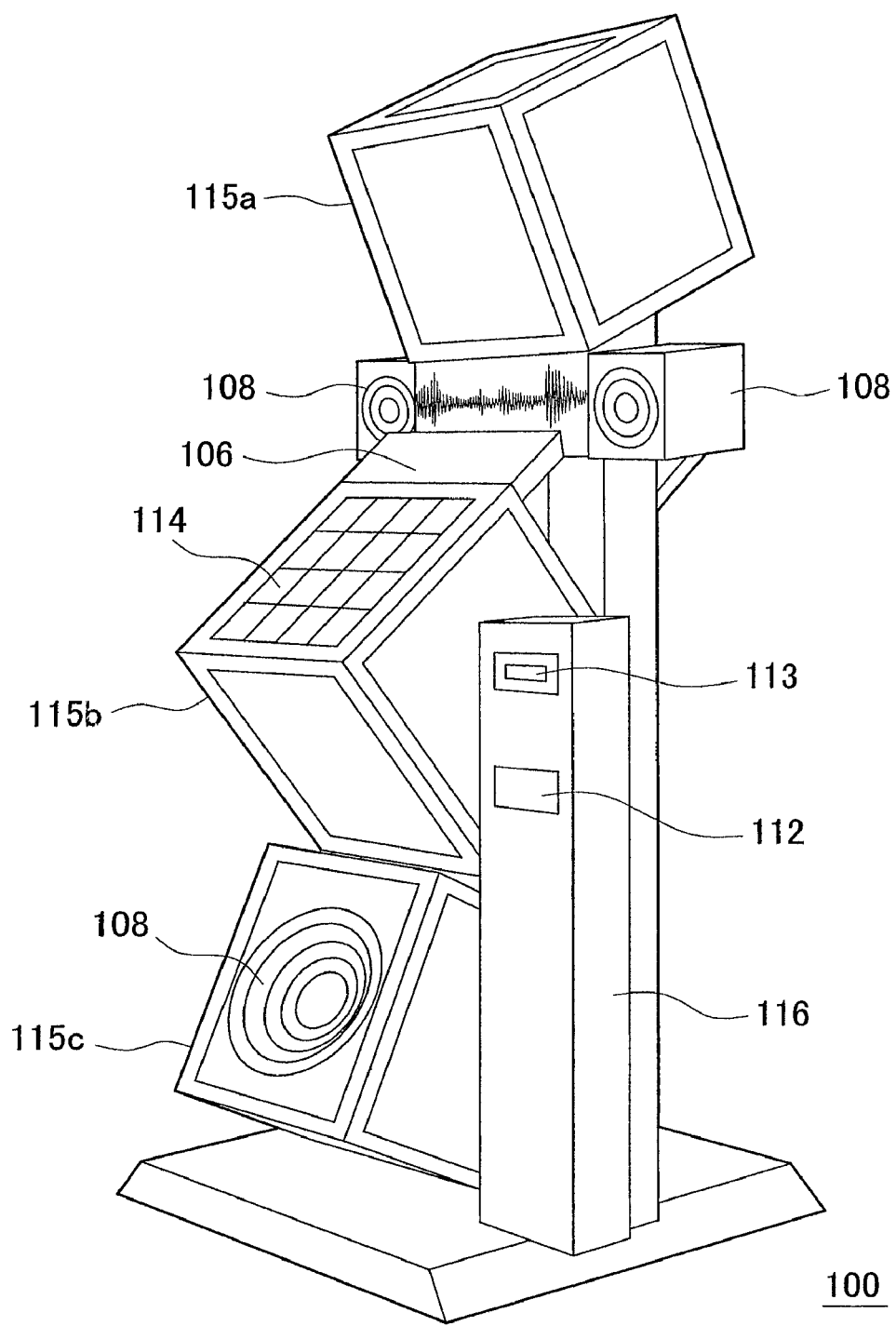
FIG. 2 is an external perspective view of a specific example of the gaming machine terminal 100.

(2) Example of Gaming Machine Terminal (2-1) Configuration of Gaming Machine Terminal FIG. 2 is an external perspective view of an example of the gaming machine terminal 100. The gaming machine terminal 100 includes upper, middle and lower cubic housings 115a, 115b, and 115c. The upper housing 115a is used, for example, for decoration or signs. The middle housing 115b is tilted so that a player can easily watch one surface thereof, the surface being integrally provided with the display unit 106 and operation units 114. The lower housing 115c has the speaker 108 incorporated therein for sound effects of songs. Another speaker 108 is also installed between the housings 115a and 115b. Beside the housings 115a, 115b, and 115c, the other housing 116 is provided with the coin acceptor 113 and the card reader/writer 112.

Figure 3:
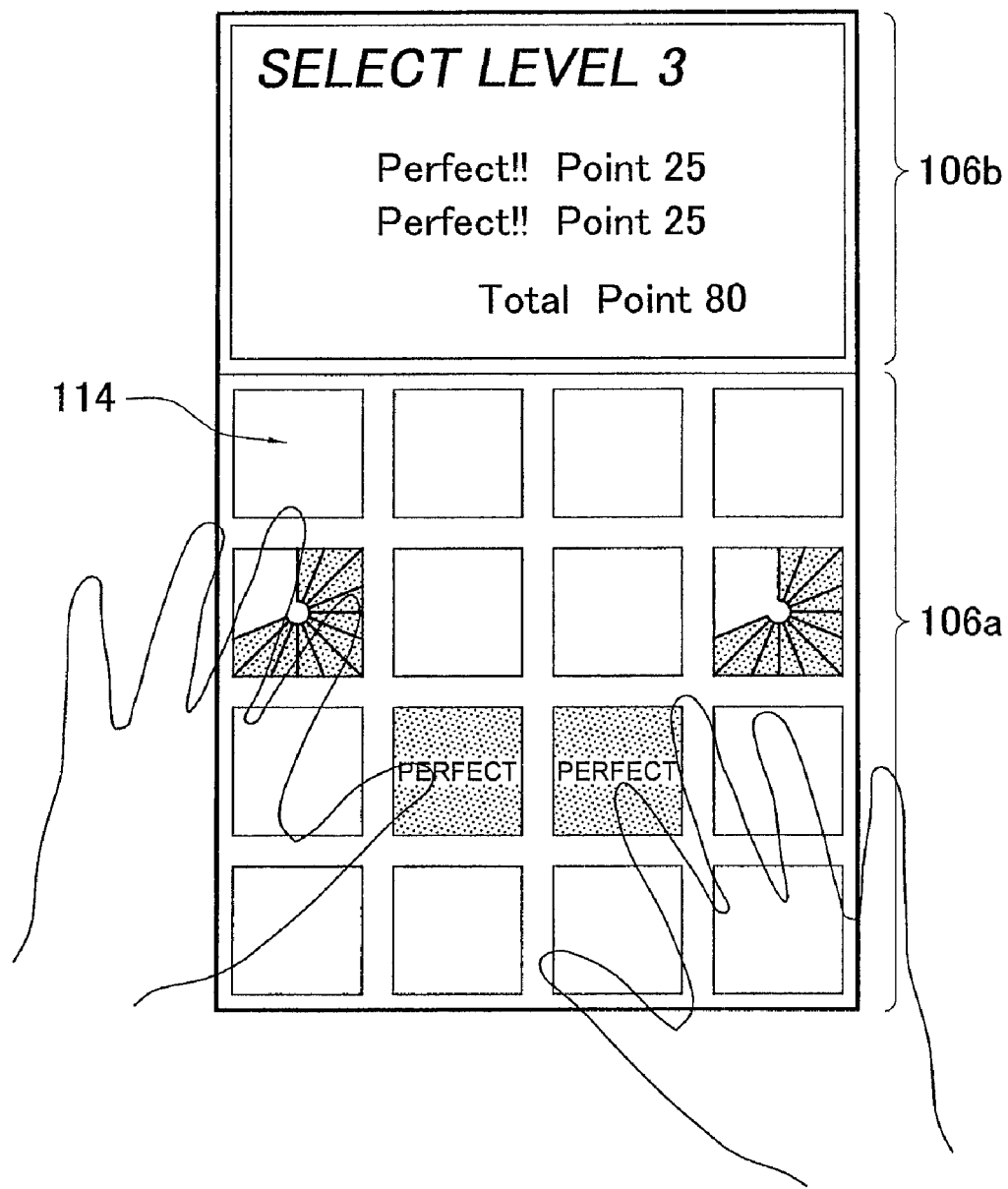
FIG. 3 is an external enlarged view of operation units 114 and a display unit 106.

FIG. 3 is an external enlarged view of the operation units 114 and the display unit 106. The display region of the display unit 106 has a first area 106a to display operation instructions, and a second area 106b to display decorative lights, a game score, and demonstration screen during a game. The display unit 106 may be a liquid crystal display, an organic EL display, a non-organic EL display, for example.

As one or more operation units 114, one or more press-type button are provided on the first area 106a of the display surface of the display unit 106. The operation units 114 are made of a transparent material for example so that a player can watch the display surface of the display unit 106 through the surfaces of the operation units 114. In the present embodiment, sixteen operation units 114 are arranged to form a matrix of four rows and four columns. The first area 106a of the display unit 106 is divided into substrate-areas corresponding to the operation units 114 respectively, so that each of the sub-areas displays an operation instruction for a corresponding operation unit 114. In the present embodiment, the first area 106a of the display unit 106 is divided into sub-areas arranged in four rows and four columns in correspondence to the operation units 114 arranged in four rows and four columns. The number and arrangement of the operation units 114 and the sub-areas are not limited to those described above.

(2-2) Implementation of Game

The gaming machine terminal 100 configured as above described implements a game as follows, in accordance with a control program stored in the ROM 103. A player inserts his/her own magnetic card into the card reader/writer 112 of the game terminal device 100, and drops a coin into the coin acceptor 113. The gaming machine terminal 100 reads personal data from the magnetic card inserted into the card reader/writer 112. When the gaming machine terminal 100 accepts an instruction to start a game from the player, the CPU 101 executes the control program to start the game. The start of the game triggers the computation of a game score.

The personal data is described below.

(2-3) Summary of Game

The flow of the game implemented in the gaming machine terminal 100 is outlined below. First, the gaming machine terminal 100 accepts a difficulty level of the game that is, for example, an index for a difficulty of the game, from a player. Alternatively, the gaming machine terminal 100 may determine a difficulty level of the game based on game scores the player already have.

Next, an operation sequence corresponding to a difficulty level is selected. An operation sequence is a program defining the operation unit 114 for an input operation and an input timing to perform the input operation on the operation unit 114. According to the operation sequence, an operation instruction is displayed on a sub-area corresponding to the operation unit 114 for input operation among the display areas of the display unit 106.

A player checks the operation instruction displayed on each sub-area through the surface of the corresponding operation unit 114. Then, the player performs an input operation in response to the operation instructions, the input operation includes the player pressing down on predetermined sub-areas of the operation unit 114 in accordance with the operation instructions. The gaming machine terminal 100 evaluates a game score of the player based on the input operation. Specifically, the player is presented with a sequence in accordance with the operation sequence either visually on the operation unit 114 and/or via audio through the speakers 108. The sequence requires that the player presses appropriate sub-areas of the operation unit 114 within a predetermined input timing. The players response, which include pressing (operation input) the sub-areas of the operation unit 114, is timed to provide an operation timing. The operation timing provides the means to determine the game score for the player, as described below.

(3) Functional Configuration of Gaming Machine Terminal

Figure 4:
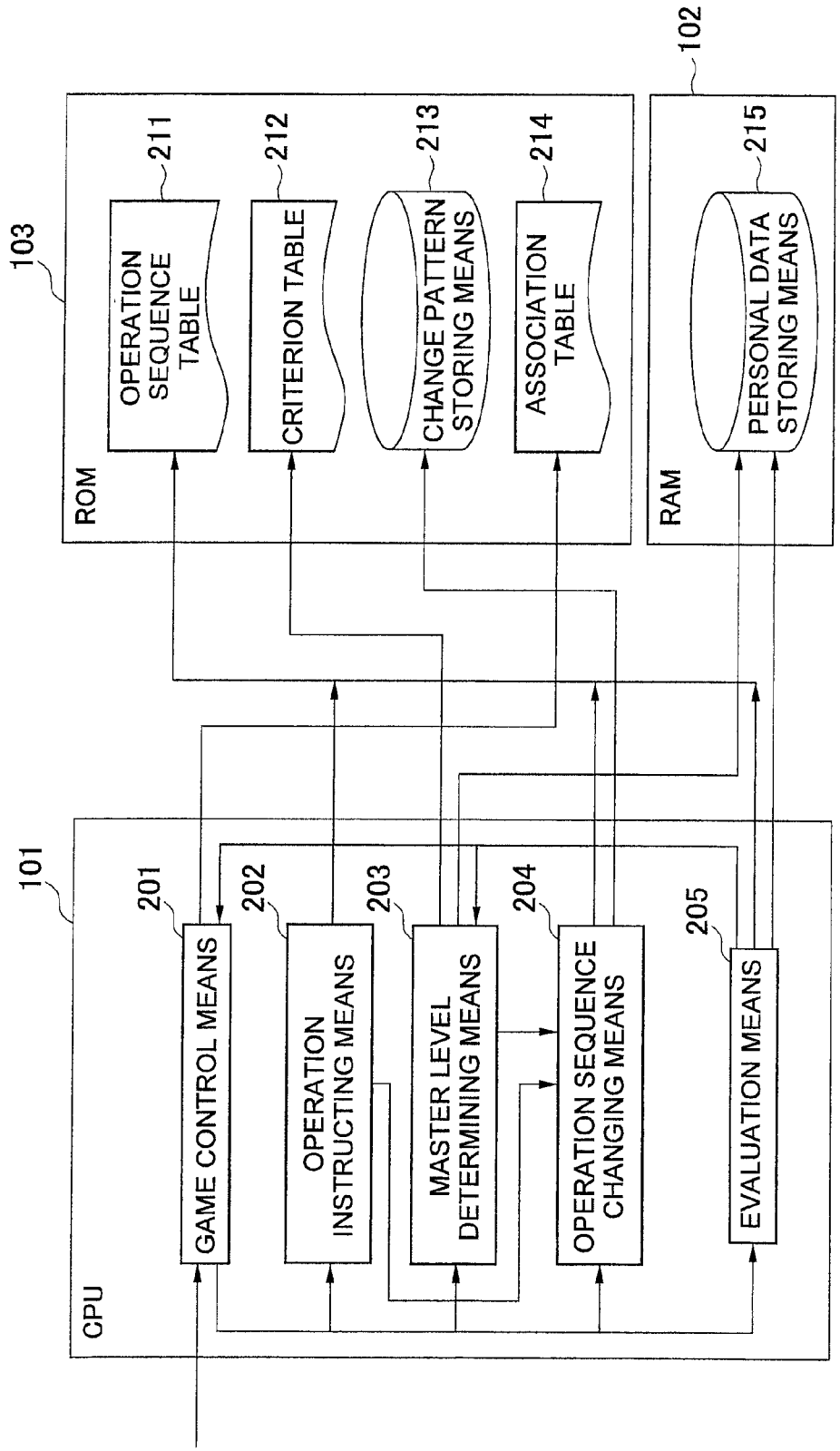
FIG. 4 illustrates a functional configuration of the gaming machine terminal 100 according to an embodiment.

FIG. 4 illustrates a functional configuration of the gaming machine terminal 100 according to the depicted embodiment. The gaming machine terminal 100 includes the CPU 101 having game control means 201, operation instructing means 202, master level determining means 203, operation sequence changing means 204, and evaluation means 205. The gaming machine terminal 100 includes the ROM 103 having an operation sequence table 211, a criterion table 212, change pattern storing means 213, and an association table 214. The RAM 204 of the gaming machine terminal 100 includes a personal data storing means 215. The CPU 101 of the gaming machine terminal 100 uses the means and tables to implement the game and compute a game score which is displayed on the second area 106b of the display unit 106.

(3-2) RAM (Personal Data Storage Means)

FIG. 5 illustrates an example of the personal data storing means. In this example, the personal data contains "player ID", "player's name", "card ID", "operation sequence ID", "number of plays", and "game score" in one record. The "player ID" is information for identifying a player. The "player's name" is the name of a player. The "card ID" is information for identifying the card belonging to a player. The "operation sequence ID" is information for identifying an operation sequence which will be described later. The "number of plays" is the number a player played the game in the past. The "game score" is a history of scores a player obtained for the game in the past. For example, a player with a player ID (P0001), a player's name (Taro Yamada), and a Card ID (C0001) means that the player have played the game based on the operation sequence ID (S0001) three times in the past, and the game scores are 30 points, 50 points, and 65 points for each of the game.

When a player plays the game based on an operation sequence ID, the number of plays corresponding to the player ID and the operation sequence ID for the player is incremented by one. At the end of the game, a game score of the player is computed and added.

(3-3) ROM (Operation Sequence Table)

FIG. 6 illustrates an example of an arrangement of the operation units, and operation sequences. FIG. 6(a) is a schematic view of operation units 114 according to the present embodiment each having an operation unit number thereon, whereas FIG. 6(b) illustrates an example of an operation sequence stored in the operation sequence table 211. For ease of illustration, as illustrated in FIG. 6(a), the operation units 114 arranged in four rows and four columns of the present embodiment are referred to as operation units No. 1 to No. 16 respectively. The first area 106a of the display unit 106 is divided into sub-areas Nos. 1 to 16 corresponding to the operation units Nos. 1 to 16 respectively.

The operation sequence table 211 stores a plurality of operation sequences each corresponding to an operation sequence ID. The operation sequence ID is an identifier for identifying an operation sequence. As illustrated in FIG. 6(b), an operation sequence defines operation units 114 for input operations, and a group of input timings that sets a plurality of input timings in time series when input operations are performed using the operation units 114. Specifically, an operation sequence stores a flag associated with a time for each operation unit number, for example. The flag "1" means ON, whereas the flag "0" means OFF. For example, the operation unit No. 1 has the flag that is 1 at the time t3, and thereby an operation instruction for an input operation of the operation unit No. 1 at the time t3 is output to the sub-area No. 1.

In addition, an operation sequence is divided into a number of zones. In the case where an operation sequence is prepared based on a song, the start and end of a zone is defined by when the tone of the song changes, a new phrase starts, or the song is resumed after an interlude, for example. In FIG. 6(b), for example, the operation sequence is divided into zones at every ten time points, like times t0 to t9, the times t10 to t19, and so on.

At the end of each zone, a change flag is provided. A change flag defines a timing when the operation sequence changing means 204 changes an operation sequence during a game, a timing when the evaluation means 205 determines a game score during a game, a timing when the master level determining means 203 determines a master level during a game: these means will be described later. The change flag "1" means ON for a predetermined timing, whereas the change flag "0" means OFF. For example, the operation sequence changing means 204 changes the operation sequence data after the time t10, based on the change flat "1" at the time t9. The evaluation means 205 computes a game score for the zone A that contains the time t9, based on the change flag "1" at the time t9. The master level determining means 203 determines a master level using the game score for the zone A that contains the time t9, based on the change flag "1" at the time t9.

(Criterion Table)

Figure 9:
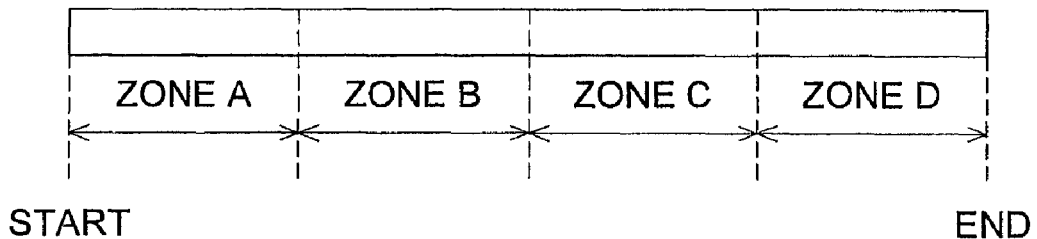
FIG. 9(*a*) illustrates a game that is divided into a plurality of zones, and FIG. 9(*b*) illustrates the other example of a criterion table.

FIGS. 7 to 9 each illustrate an example of a criterion table. A criterion table 212 defines a criterion for determining a master level of a player. The master level is a degree of familiarity of a player to a game based on an operation sequence.

FIG. 7 contains master levels associated with game score of the past. For example, if a player can receive 100 scores in total from a game, a higher master level is set for a higher score. In FIG. 7, five master levels are set for 0-20 scores, 21-40 scores, 41-60 scores, 61-80 scores, and 81-100 scores, respectively. An appropriate master level corresponding to a game score in the criterion table of FIG. 7 is determined with reference to the game score of the past in the personal data storing means 215.

In FIG. 8, master levels are associated with the number of plays. For example, a higher master level is set for a larger number of plays. In FIG. 8, five master levels are set for 0-2 times, 3-4 times, 5-6 times, 7-8 times, and 9 or more times, respectively. An appropriate master level corresponding to the number of plays in the criterion table of FIG. 8 is determined with reference to the number of plays of the past in the personal data storing means 215.

FIG. 9 illustrates the correspondence between a master level and the game score in each zone. FIG. 9(a) illustrates zones of a game, whereas FIG. 9(b) illustrates the correspondence between a master level and the game score in each zone. In FIG. 9(a), one game is divided into four zones A to D. In a game for 100 full scores, a player can receive 25 scores in each zone. In FIG. 9, five master levels are set for 0-5 scores, 6-10 scores, 11-15 scores, 16-20 scores, and 21-25 scores, respectively. During a game, for example, at the end of the zone A, a game score for the zone A is computed to determine a master level for the game score from the criterion table in FIG. 9(b).

(Changed Pattern Storage Means)

FIG. 10 illustrates an example of change pattern storing means. The detail of a change is defined for each change pattern ID. For example, the detail of a change corresponding to a pattern ID (PT0001) is a change of the operation unit No. 1 into the operation unit No. 2 at the group of input timings of the times t(x0) to t(x9), wherein x is an integer value such as 0, 1, 2, and so on. As illustrated in FIG. 6(*b*), the operation sequence is divided into zones for the times t0 to t9, the times t10 to t19, and the like, for every ten times. Accordingly, if x=0, the operation unit No. 1 is changed into the operation unit No. 2 at the group of input timings of the times t(0) to t(9). For example, the input timings (0, 1, 0, 0, 0, 1, 0, 0, 0, 0) at the times t(0) to t(9) for the operation unit No. 2 is overwritten with the input timings (0, 0, 0, 1, 0, 1, 0, 1, 0, 1) at the times t(0) to t(9) for the operation unit No. 1. This changes the input timings of the times t(0) to t(9) for the operation unit No. 2 into (0, 0, 0, 1, 0, 1, 0, 1, 0, 1). In addition, the input timings (0) at the times t(0) to t(9) for the operation unit No. 2 are overwritten with the input timings (1) at the times t(0) to t(9) for the operation unit No. 1. This changes the input timings of the times t(0) to t(9) for the operation unit No. 2 into (0, 1, 0, 1, 0, 1, 0, 1, 0, 1). Whereas, the input timings of the times t(0) to t(9) for the operation unit No. 1 are set to "0", resulting in (0, 0, 0, 0, 0, 0, 0, 0, 0, 0). If x=2, the operation unit No. 1 is changed into the operation unit No. 2 at the group of input timings of the times t(20) to t(29).

The change only needs to be applied to a part of at least one group of input timings, and the changes are not limited to those in FIG. 10.

(Association Table)

Figures 11, 12:
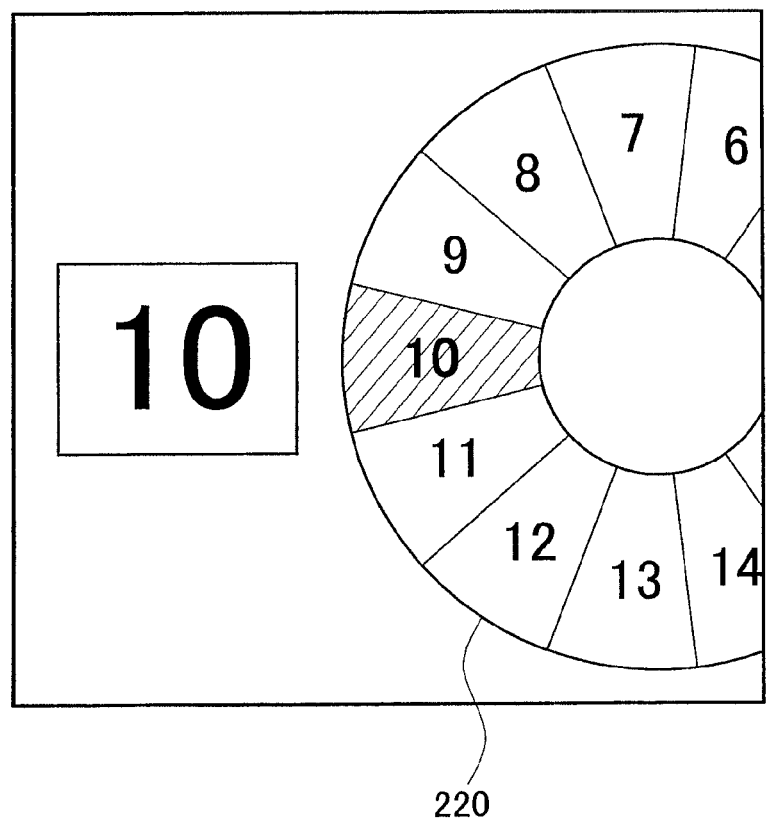
FIG. 11 illustrates an example of an association table 214.
FIG. 12 illustrates an example of a difficulty level selection screen.

FIG. 11 illustrates an example of the association table 214. The association table 214 contains records each associated with a difficulty level and an operation sequence ID of the game.

(3-4) Functions of CPU (Game Controlling Means)

A game controlling means 201 reads personal data from a magnetic card inserted into the card reader/writer 112, prior to implementation of the game. The personal data contains a player ID, game scores a player already have, and the like.

The game controlling means 201 accepts, through the external input/output control unit 109, a difficulty level of a game from a player using the operation unit 114 and the like, and determines an operation sequence corresponding to the difficulty level.

FIG. 12 illustrates an example of a difficulty level selection screen. The game controlling means 201 displays the difficulty level selection screen of FIG. 12 onto the second area 106*b* of the display unit 106. The ring-shaped table 220 contains difficulty levels of the game in sequence. A player scrolls the ring-shaped table 220 by operating a predetermined operation unit 114, and presses down a selection button which is one of the operation units 114 at a desired difficulty level of the game. The game controlling means 201 in this way accepts the difficulty level of the game from the player. In FIG. 12, the difficulty level "10" of the game is selected and displayed in the enlarged image. The game controlling means 201 determines an operation sequence ID corresponding to the received difficulty level based on the association table 214 in FIG. 11.

The game controlling means 201 may prepare a table between game scores and operation sequence IDs, to determine an operation sequence ID according to the game score of the past of a player, based on the table.

The game controlling means 201 receives input operations using the operation units 114 (the player presses one or more of the operation units 114) and so on by a player through the external input/output control unit 109. The game controlling means 201 outputs image effects onto the display unit 106 or sound effects from the speaker 108, based on the progress of the game and input operations from the player. The game controlling means 201 also perform various processes for displaying a game score, determining a game end, checking a game continuation, and the like.

Furthermore, the game controlling means 201 transmits the operation sequence ID determined based on the difficulty level and the player ID read from a magnetic card to each means.

(Operation Instructing Means)

The operation instructing means 202 receives from the game controlling means 201 an operation sequence ID corresponding to the difficulty level accepted from a player. The operation instructing means 202 extracts an operation sequence corresponding to the operation sequence ID, from the operation sequence table 211. The operation instructing means 202 displays the operation instruction on a sub-area corresponding to the operation unit 114 for input operation (pressing sequences of sub-areas of the operation unit 114 by a player), based on the extracted operation sequence. For example, the operation instruction is output using illuminations, or predetermined colors at the sub-area. Alternatively, the operation instruction may be displayed by changing the form thereof gradually over a predetermined period of time before the input timing.

To change an operation sequence during a game, the operation sequence changing means 204, described below, needs to change the portion of the operation sequence that is not completed yet. Accordingly, the operation instructing means 202 transmits completed zone data to the operation sequence changing means 204 based on a change flag. The completed zone data shows the end zone in an operation sequence where the operation instructions are completed. In the case where an operation sequence is changed before a game starts, however, the operation instructing means 202 does not have to transmit the completed zone data, due to the lack of a need for the information of completed change in the operation sequence.

(Skill Level Determining Means)

The master level determining means 203 determines a master level of a player with reference to the criterion table 212. The determination of a master level may be based on the past game information such as game scores and the number of plays of the past, or the current game information such as the game score of a currently on-going game.

First, the case where a master level is determined based on game scores and the number of plays of the past will be described. The master level determining means 203 receives a player ID and an operation sequence ID corresponding to a difficulty level from the game controlling means 201. The master level determining means 203 reads game scores and the number of plays, and so on, of the past corresponding to the player ID and the operation sequence ID from the personal data storing means 215. For example, in the case with a player ID (P0001) and an operation sequence ID (S0002), the number of plays (7) and the game score (15, 20, 25, 40, 65, 60, 85) are read. The master level determining means 203 determines a master level by checking the game score of the past with the criterion table in FIG. 7. If there are a plurality of game score of the past, for example, a master level is determined based on the highest score, the lowest score, or the average game score for a predetermined numbers of games in descending order of scores. The master level determining means 203 determines a master level by checking the number of plays of the past with the criterion table in FIG. 8.

Next, the case where a master level is determined based on the game score of a currently on-going game will be described. The evaluation means 205 detects the end of each zone based on the change flag "1" of the operation sequence in FIG. 6(b) for example. Then, the evaluation means 205 computes a game score of the zone having the detected change flag "1" to transmit to the master level determining means 203. The master level determining means 203 receives the game score of the zone from the evaluation means 205 based on the change flag "1", and also determines a master level by checking the game score of the zone with the criterion table in FIG. 9.

The master level determining means 203 has a predetermined value to determine whether or not a master level exceeds the predetermined value. In other words, the master level determining means 203 determines whether or not a player has a master level that exceeds the predetermined value and is familiar with the game. The master level determining means 203 transmits the determination result to the operation sequence changing means 204.

As described above, in the case where, with respect to an operation sequence, a player has the number of plays of the operation sequence that is equal to or more than a predetermined number, or a game score of the past or a current game score based on the operation sequence that is equal to or more than a predetermined number, the player is determined to be familiar with the operation sequence flow and have a master level equal to or more than a predetermined value. Thus, a change in the operation sequence based on the determination provides fresh feeling and sense of tension for the player instead of familiarity.

The master level determining means 203 may determine a master level based on a combination of conditions such as a game score for each zone in a currently on-going game, game scores of the past, and the number of plays of the past. For example, in the case where not a game score of the past but the number of plays of the past satisfies a predetermined master level, the master level determining means 203 determines a master level based on the number of plays of the past. The master level determining means 203 may determine a master level according to an equation of (master level based on game score of the past)×0.5+(master level based on the number of plays of the past)×0.5. In the case where the current game score in each zone does not satisfy a predetermined master level, but one of a game score of the past or the number of plays of the past satisfies a predetermined master level, for example, a master level is determined based on the game score of the past or the number of plays of the past.

In the case where a master level is determined based on a game score of the past and the number of plays of the past, because the personal data storing means 215 stores the data, the master level may be determined before the start of a game or during the game.

(Operation Sequence Changing Means)

After the master level determining means 203 determines that a master level is equal to or more than a predetermined value, the operation sequence changing means 204 changes an operation sequence as follows. First, the operation sequence changing means 204 receives an operation sequence ID corresponding to the difficulty level from the game controlling means 201. The operation sequence changing means 204 selects, for example, arbitrarily a change pattern from the change pattern storing means 213 to determine the detail of a change. Next, the operation sequence changing means 204 changes an operation sequence corresponding to the operation sequence ID based on the selected change pattern. Specifically, the operation sequence changing means 204 changes a part of at least one group of input timings, which is a part of an operation sequence.

At this point, if a master level is determined during a game, the change in a part of an operation sequence is performed during the game. In contrast, if a master level is determined before a game starts, the operation sequence may be partly changed before the start of the game or during the game.

(a) The case where a master level is determined during a game or before the game starts and a part of operation sequence is changed during the game will be described below with reference to FIG. 13.

Figure 13:
FIG. 13 illustrates an example of a change in an operation sequence.

FIG. 13 illustrates an example of a change in an operation sequence. Part (a) of FIG. 13 illustrates an operation sequence before change, whereas the part (b) illustrates the operation sequence after change. The operation sequence changing means 204 selects the change pattern of the pattern ID (PT0004). The detail of a change according to the pattern ID (PT0004) is to replace the groups of input timings of the time t(x0) to t(x9) for operation unit No. 3 with those for the operation unit No. 4, in the operation sequences.

The operation sequence changing means 204 performs the following processes at change timings to change an operation sequences. The operation sequence changing means 204 receives completed zone data from the operation instructing means 202. The completed zone data shows the zones with completed operation instructions in the operation sequence. Then, the operation sequence changing means 204 selects at least one zone after the zone shown in the completed zone data, as a zone to be changed. Herein, the selected one or more zone is defined as a change zone. In the case where an operation sequence is partly changed during a game, the operation sequence changing means 204 obtains the information of zones where the game ended, and change the operation sequence after the zone.

Assume that the completed zone data shows that the zone A is completed, and that the zone B is selected as a change zone, with the condition of X=1. The operation sequence changing means 204 replaces the groups of input timings of the times t(10) to t(19) for operation unit No. 3 with those for the operation unit No. 4, in the operation sequences. As illustrated in FIGS. 13(a) and 13(b), the group of input timings of the times t(10) to t(19) for the operation unit No. 3 is replaced with the group of input timings of the times t(10) to t(19) for the operation unit No. 4. In contrast, the group of input timings of the times t(10) to t(19) for the operation unit No. 4 is replaced with the group of input timings of the times t(10) to t(19) for the operation unit No. 3.

The operation sequence changing means 204 may select a change pattern and determine a change zone every time a change flag turns to "1", for a change in an operation sequence. The operation sequence changing means 204 may disregard the change flag "1" after changing the operation sequence to an upper limited number of times. The upper limited number of times is a maximum number of times an operation sequence can be changed. For example, assume that the ROM 103 sets the upper limited number of times to be two. Then the operation sequence changing means 204 counts and records the number of times it changed the operation sequence, and compares the number of times of changes with the upper limited number of times when a change flag turns to "1". After changing the operation sequence twice, the operation sequence changing means 204 disregards the change flag and will not change the operation sequence.

(b) Now, the case where a master level is determined before a game starts and a part of operation sequence is changed before the start is described.

To change a part of an operation sequence before a game starts, at least one zone out of the zones constituting an operation sequence is selected as a change zone. Thus, the operation sequence changing means 204 does not need to obtain completed zone data from the operation instructing means 202.

Assume that the operation sequence changing means 204 selects a change pattern of an pattern ID (PT0004), and selects the zone B as a change zone out of the zones constituting the operation sequence, with the condition of x=1. In this case, the operation sequence is changed as illustrated in FIG. 13.

(Evaluation Means)

A player checks an operation instruction displayed on each sub-area in the display area of the display unit 106, through each of the operation units 114. The player presses down the operation unit 114 having the operation instruction displayed thereon according to the operation instruction for input operation. The input operation (pressing down) of the operation unit 114 generates a signal to be transmitted to the CPU 101 through the external device control unit 110 and the external input/output control unit 109. The evaluation means 205 detects whether or not the operation unit 114 has been pressed down and also detects the operation timing when the operation unit 114 was operated. Specifically, the evaluation means 205 determined when the operation unit 114 was operated (pressed down) relative to the input timing.

The evaluation means 205 determines, based on the association table 214 in FIG. 11, an operation sequence ID corresponding to a difficulty level received from the game controlling means 201. The evaluation means 205 refers to the operation sequence having the operation sequence ID to evaluate whether or not the correct operation unit 114 according to the operation instruction was operated (pressed), the difference between the input timing and the operation timing, and the like. For example, the evaluation means 205 computes a game score of a player based on the evaluation result. The game controlling means 201 displays the computed game score on the second area 106 of the display unit 106*b*.

Because a game score is computed in consideration with the difference between the input timing and the operation timing of the operation unit 114 to be pressed for input operation, so that the game score varies depending on the skill of the player, the player tries to operate the operation units 114 at the input timings as precise as possible, and enjoys the game. For example, in the case with a smaller difference between the input timing and the operation timing, the evaluation means 205 determines the response to the operation instruction to be appropriate, and provides a high score to the player. In the case where a higher difficulty level is set for a higher score in a game, the evaluation means 205 computes the game score according to the difficulty level of the game.

If a game includes several stages to play, the evaluation means 205 may compute a total game score of the stages after the stages are completed.

The evaluation means 205 transmits the game score to the game controlling means 201 for displaying the game score on the display unit 106. The evaluation means 205 transmits the game score to the personal data storing means 215 for storing. The evaluation means 205 also transmits the game score of each zone to the master level determining means 203 according to a change timing.

(4) Process Flow

Figure 14:
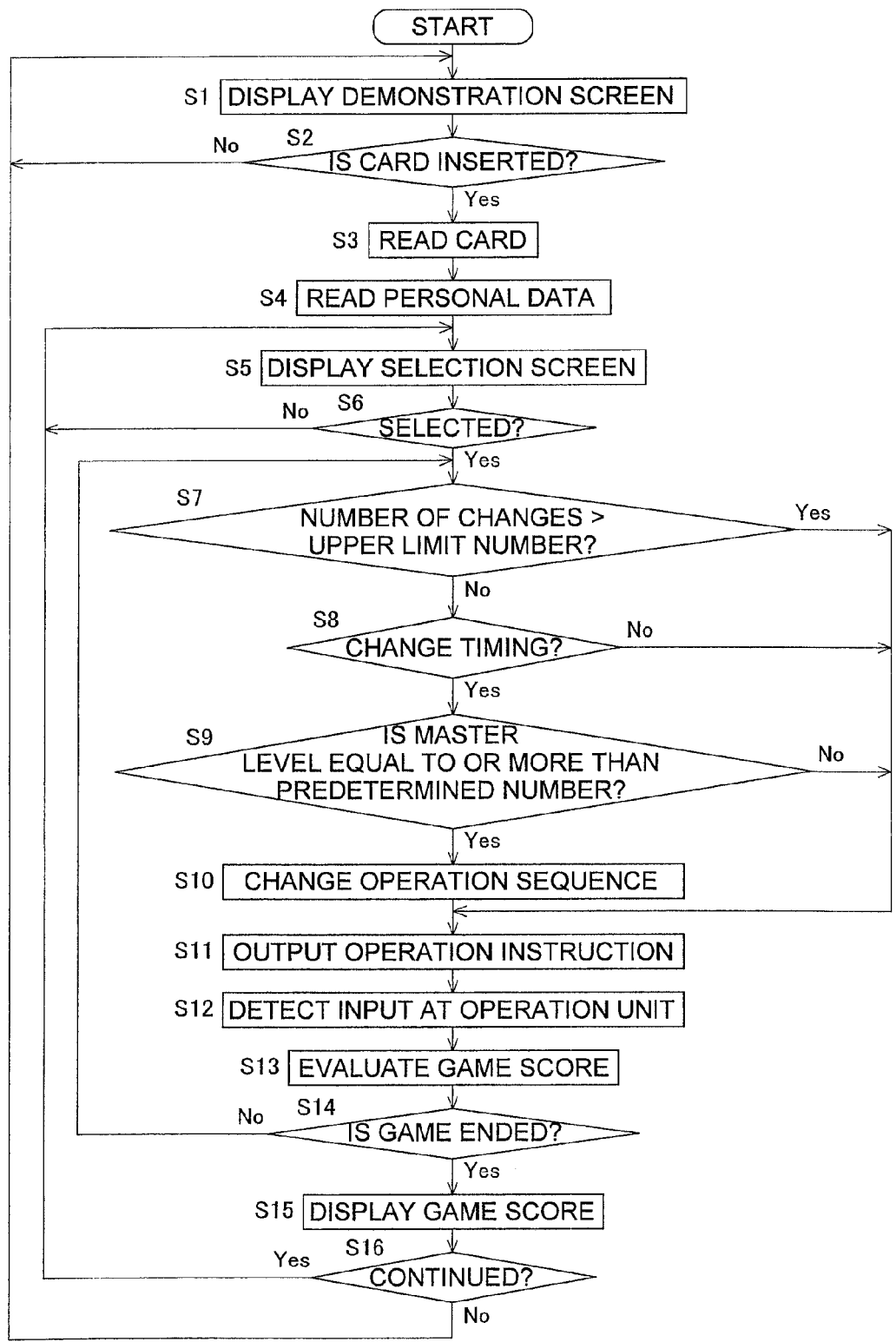
FIG. 14 is an example of a flowchart of processes performed by the gaming machine terminal 100.

FIG. 14 is an example of a flowchart processes performed by the gaming machine terminal 100. When turned on, the gaming machine terminal 100 starts the following processes. The following is an example of a game during which a part of operation sequence is changed in response to a change timing, the game having an upper limit for the number of changes.

At step S1 to S2: the CPU 101 waits for an instruction to start a game while displaying a demonstration screen (S1). More specifically, at step S2, the CPU 101 determines whether or not a coin has been dropped in and a magnetic card has been inserted to the card reader/writer 112 (S2). Next, the process goes to step S3.

At step S3 to S4: the CPU 101 reads the magnetic card in the card reader/writer 112 (S3), and reads personal data therefrom (S4).

At step S5 to S6: the CPU 101 displays a difficulty level selection screen on the display unit 106 (S5). The CPU 101 accepts a selection of one difficulty level, and determines an operation sequence corresponding to the difficulty level based on the association table 214 (S6).

At step S7: the CPU 101 compares the upper limit number of the changes applicable to the operation sequence with the number of changes performed on the operation sequence. If the number of changes is equal to or less than the upper limit number, the process goes to step S8. If the number of changes is above the upper limit number, the process goes to step S11.

At step S8: the CPU 101 determines whether or not it is the time to change the operation sequence based on the change flag of the operation sequence. If the change flag is "1", the process goes to step S9, whereas if the change flag is "0", the process goes to step S11.

At step S9: Then, the CPU 101 determines a master level based on a game score of the past, the number of plays of the past, and a game score of each zone of the on-going game. If the master level is equal to or more than a predetermined value, the process goes to step S10, whereas if the master level is less than the predetermined value, the process goes to step S11.

At step S10: for the master level equal to or more than the predetermined value, the CPU 101 changes a part of at least one group of input timings, or a part of the operation sequence.

At step S11: the CPU 101 displays an operation instruction on a sub-area corresponding to the operation unit 114 to be operated for an input, based on the operation sequence.

At steps S12 to S14: the CPU 101 accepts the input operation (pressing) using the operation unit 114 by the player (S12), evaluates the operation, and computes a game score (S13). The CPU 101 implements the game to the end (S14).

At step S15: at the end of the game, the CPU 101 displays the game score on the display unit 106, and writes the game score into the magnetic card.

At step S16: the CPU 101 inquire the player if the player continues the game or not. If yes, the process goes back to step S5 to accept a selection of a difficulty level again, whereas if no, the process goes back to step S1 to display the demonstration screen.

(5) Advantages

The gaming machine terminal according to the present invention progresses a game based on an operation sequence corresponding to the game a player selected, or an operation sequence selected according to a master level of a player. In the case with a master level of a player equal to or more than a predetermined value, the player can be determined to be familiar with the on-going operation sequence and knows a next operation unit 114 to perform for input operation and the input timing. Then, in the case where a player has a master level equal to or more than a predetermined value, a part of a group of input timings, that is to say a part of the operation sequence is changed. The part of the operation sequence may be any part thereof, like the beginning, end, or middle part thereof. The change in the operation sequence causes changes in the operation units 114 to be operated for input operation and the input timings, and thereby even the game that is based on the operation sequence a player repeatedly played can provide fresh feeling for the game for the player. When the operation sequence is changed, the player cannot operate the operation units 114 using his/her memory, which requires quick reaction of the player to the change, and increases sense of tension of the player to the game. As described above, according to the present invention, the change in an operation sequence provides fresh feeling and sense of tension to the game for a player, and maintains or enhances the interest to the game and willingness to challenge the game of the player.

In the above embodiment, in a part of a group of input timings corresponding to an operation unit 114, a certain operation unit 114 to be operated for input is replaced with another operation unit 114. Accordingly, even a game that is based on the operation sequence a player repeatedly played can provide fresh feeling and sense of tension to the game for the player.

The change flag in the above embodiment is positioned, in the case where the operation sequence is based on a song, at a position where the tone of the song changes, a new phrase starts, or the song is resumed after an interlude, for example. When an operation sequence is changed based on the change flag, the operation sequence is changed at the timing when the rhythm of the song obviously changes, then a player easily responds to the change in the operation sequence.

A change pattern may have the detail of a change in advance, such as the switch of an operation unit No. 1 with an operation unit No. 2. In this case, however, there appears a player who soon gets used to the change. In the above embodiment, however, the operation sequence changing means 204 selects any change pattern from the change pattern storing means 213 and determines the detail of a change. Accordingly, in a part of a group of input timings, the operation unit No. 1 as the operation unit 114 to be operated for input may be replaced with any one of the operation unit No. 2 to No. 16. In the case with such a random change in an operation sequence, the game provides more fresh feeling and sense of tension for a player than the game with a predetermined change in an operation sequence.

In the above embodiment, when a change flag turns to be "1", a master level is determined based on the game score of a previous zone, and the operation sequence of the subsequent zones are partly or completely changed. As a result, the operation sequence is partly changed based on the most recent master level before the change in the operation sequence.

<Other Embodiments>
(a) First Modified Embodiment

The operation units 114 in the above embodiment are arranged along predetermined directions, specifically in four rows and four columns. Assume that an operation sequence includes a routine sequence for input operations along the predetermined direction in time series. The operation sequence changing means 204 replaces an operation unit 114 to another operation unit 114 that is disposed in a direction different from the predetermined direction at a part of at least one group of input timings of the routine sequence.

Figure 15:
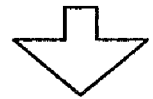
FIG. 15(*a*) illustrates an operation order based on a routine sequence, and FIG. 15(*b*) illustrates an operation order based on a changed operation sequence.

FIG. 15 illustrates a first modified embodiment: FIG. 15(*a*) illustrates an operation order based on a routine sequence; and FIG. 15(*b*) illustrates an operation order based on a changed operation sequence. FIG. 16(*a*) illustrates a routine sequence; and FIG. 16(*b*) illustrates a sequence of a change pattern. FIG. 17 illustrates an example of a change in an operation sequence: FIG. 17(*a*) illustrates an operation sequence before change; and FIG. 17(*b*) illustrates the operation sequence after change. In the routine sequence, as illustrated in FIG. 15(*a*), operation instructions are made in sequence from the top to the bottom of the column for the operation unit No. 5, operation unit No. 16, operation unit No. 15, and operation unit No. 14. This routine sequence can be expressed as illustrated in FIG. 16(*a*). The operation sequence including this routine sequence is illustrated at the times t10 to t17 in FIG. 17(*a*). The operation instruction based on the routine sequence facilitates a player to predict a next operation unit 114 to operate for input. Then, the operation sequence changing means 204 changes a part of the routine sequence. In FIG. 15(*b*), the most recent operation instruction in the routine sequence is changed, and the operation instructions are made in sequence for the operation unit No. 5, operation unit No. 16, operation unit No. 15, operation unit No. 13. The change pattern to change the routine sequence is illustrated in FIG. 16(*b*), and the change in the routine sequence based on the change pattern is illustrated in FIG. 17(*b*).

FIG. 18 illustrates an example of a table stored in the change pattern storing means of the first modified embodiment. Each routine sequence ID is associated with change pattern IDs and operation sequence IDs. For example, the routine sequence ID (F0002) can be changed using the change pattern ID (PT1002) or the change pattern ID (PT1003). The routine sequence ID (F0002) corresponds to the times t32 to t38 of the operation sequence for the operation sequence ID (S0007), and the times t80 to t86 of the operation sequence for the operation sequence ID (S0015). The change pattern storing means 213 stores a routine sequence for each routine sequence ID and a change pattern for each change pattern ID.

The operation sequence changing means 204 determines, based on an operation sequence ID corresponding to an operation sequence to be performed, whether or not the operation sequence contains a routine sequence, with reference to the change pattern storing means 213. If the operation sequence contains a routine sequence, the operation sequence changing means 204 determines the routine sequence ID the routine sequence of which is contained in the operation sequence. The operation sequence changing means 204 also determines a change pattern ID based on the routine sequence ID.

For example, assume that a currently on-going operation sequence has an operation sequence ID (S0007). The operation sequence changing means 204 refers to the change pattern storing means 213, and determines that the operation sequence for the operation sequence ID (S0007) contains the routine sequence for the routine sequence ID (F0002). Then, the operation sequence changing means 204 refers to the change pattern storing means 213, and selects a change pattern ID out of the change pattern IDs (PT1002) and (PT1003) corresponding to the routine sequence ID (F0002). If selected the change pattern ID (PT1002), the operation sequence changing means 204 replaces the routine sequence for routine sequence ID (F0002) in the operation sequence for the operation sequence ID (S0007) with the change pattern for the change pattern ID (PT1002).

The process flow of the present embodiment is similar to that of the above embodiment shown in FIG. 14, except the process in step S10. The other processes similar to those of the above embodiment will not described below.

At step S10: the operation sequence changing means 204 determines whether or not an operation sequence contains a routine sequence, in the case with a change flag "1" and a master level equal to or more than predetermined value. If the routine sequence is contained, the operation sequence changing means 204 determines whether or not to change the routine sequence. If yes, the routine sequence is changed using the change pattern determined as described above. In the case where the routine sequence is not contained, and in the case where no change is made in the routine sequence, the operation sequence is changed based on the determined change pattern in FIG. 10.

After an operation instruction is made based on the routine sequence, a player can predict a next operation unit 114 to operate for input. However, a change in the routine sequence as described in the first modified embodiment makes the prediction impossible, which provides fresh feeling and sense of tension to the game for the player.

Since a player predicts a next operation units 114 to be operated for input based on the former part of the routine sequence, it is preferred to change the latter part of the routine sequence, like the change of the last operation instruction in the routine sequence. For example, in the above-described routine sequence, the fourth operation unit No. 14 is changed into the operation unit No. 13 in the different column. Because the first to third operation units 114 are in the same column, a player expects the coming fourth operation unit 114 to be in the same column. The above-described change hinders the player from predicting a next operation unit 114 to operate for input, because the fourth operation unit 114 is not in the same column as those of the first to third operation units 114 according to the operation instruction.

The operation units 114 are arranged in a matrix in the first modified embodiment, but may be in another arrangement in a predetermined direction, such as only in a column or a row, as long as.

(b) Second Modified Embodiment

In a second modified embodiment, the operation sequence changing means 204 changes at least a part of a mastered pattern having a matching degree between an operation timing and an input timing of the operation units 114 that is equal to a predetermined value or more. The mastered pattern is a pattern that has a matching degree equal to a predetermined value or more and a player is familiar with for input operation.

FIG. 19 shows a list of matching degrees between operation timings of the operation units 114 and input timings defined by operation sequences. The evaluation means 205 ranks each position with a flag "1" in an operation sequence into five levels of "Perfect", "Great", "Good", and "Poor" and "Miss" in order from smallest to the largest difference between an operation timing and an input timing. The evaluation means 205 determines an achievement level ranging from 1 to 100% based on the determination result, and extract, for example, a zone of an achievement level of 75% or more as a mastered pattern from the operation sequence. The extracted mastered pattern is stored in the personal data storing means 215. Fig. example, in the case of FIG. 19, the operation sequence in the zone A is stored as a mastered pattern in association with an operation sequence ID.

Based on an operation sequence ID corresponding to an operation sequence to be implemented, the operation sequence changing means 204 refers to the personal data storing means 215, and determines whether or not the operation sequence contains a mastered pattern. If the operation sequence contains a mastered pattern, the operation sequence changing means 204 selects a change pattern from the change pattern storing means 213, and replaces the mastered pattern in the operation sequence with the change pattern.

As described above, the mastered pattern is a part a player is particularly familiar with. A change in the mastered pattern makes the prediction of the coming operation instructions the player could make impossible. Accordingly, even the game that is based on the operation sequence a player repeatedly played can provide fresh feeling and sense of tension to the game for the player, and further maintain or enhance the interest to the game and willingness to challenge the game of the player.

(c) Third Modified Embodiment

In a third modified embodiment, the operation sequence changing means 204 varies the details of a change in a group of input timings depending on a master level of a player. FIG. 20 illustrates an example of table between master levels stored in a change pattern storing means 213 and a changed pattern ID and details of a change. The changed pattern ID and details of a change are defined for each master level. The change pattern of a higher master level, and the more changes in an operation sequence correspond to a higher level of input operations. The master level determining means 203 transmits a master level to the operation sequence changing means 204 based on a change flag. The operation sequence changing means 204 determines a change pattern ID according to the received master level. Assume here that it is determined the master level is 2 and the change pattern ID is PT000A2. The operation sequence changing means 204 also receives a completed zone data from the operation instructing means 202 based on a change flag, and selects at least one zone after the completed zone data as a change zone where an operation sequence therein is changed. Assume here that a completed zone data is the zone A and that the operation sequence changing means 204 selects a zone B as a change zone where an operation sequence therein is changed with the condition of x=1. Accordingly, the operation sequence changing means 204 replaces the group of input timings of the times t(10) to t(19) in the operation sequence for operation unit No. 1 with those for operation unit No. 2, based on a change flag.

A player having a higher master level is more familiar with the operation instructions based on an operation sequence. A change in an operation sequence depending on a master level allows a player to enjoy the play which is appropriate for his/her master level, with more fresh feeling and sense of tension to the game that is based on the operation sequence the player repeatedly played.

(d) Fourth Modified Embodiment

In the above embodiments, a first operation unit 114 to be operated for input is replaced with a second operation unit 114 at a part of the group of input timings corresponding to the first operation unit 114. The operation sequences may be replaced using input timings, other than the operation units 114.

(e) Fifth Modified Embodiment

In the above embodiments, in the case where the operation sequence is based on a song, a change flag is positioned at the end of a zone where the rhythm of the song obviously changes for example. Alternatively, the change flag may be positioned at a timing when a predetermined period of time has passed since a game start, or random timings during a game. A random change in an operation sequence based on the change flag provides sense of tension to the game for a player.

(f) Sixth Modified Embodiment

In the above embodiments, when a change flag turns to be "1", a master level is determined based on the game score of a previous zone, and the operation sequences of the subsequent zones are partly or completely changed. Alternatively, a master level is determined before the game starts, and an operation sequence is a partly or completely changed based on the change flag after the start of the game or when a predetermined period of time has passed after the start of the game. The determination of a master level may be performed for every input operation, not for the total input operations at a predetermined timing. When a master level is of more than a predetermined value, immediately the operation sequence after the timing is partly or completely changed. In other words, the time-lag is eliminated between the time point of determination of the master level and the time point for change in the operation sequence. A player having a master level of a predetermined value can be determined to get used to the on-going operation sequence, and thereby the operation sequence after the determination is immediately changed, so that fresh feeling and sense of tension to the game can be provided for the player.

(g) Seventh Modified Embodiment

Operation instructions are not output to the sub-areas corresponding to the operation units 114, but may be output to the second area 106b of the display unit 106 for example.

(h) Eighth Modified Embodiment

Figure 21:
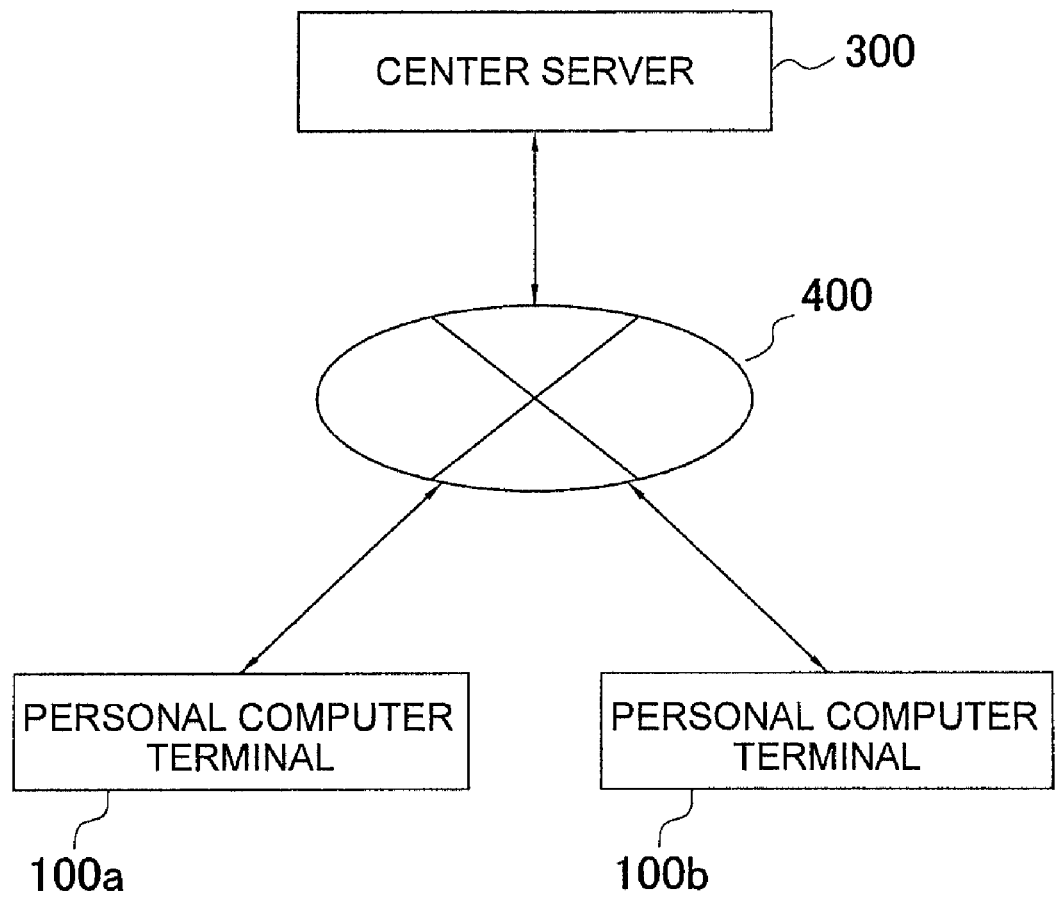
FIG. 21 illustrates a configuration of a network according to a modified embodiment.

FIG. 21 illustrates a configuration of a network according to the present modified embodiment. A plurality of gaming machine terminals 100 may be connected to a center server 300 via a network 400. The center server 300 manages personal data such as game scores, and receives and aggregates various data from each of the gaming machine terminal 100.

For example, each gaming machine terminal 100 receives a selection of a game based on a selection of a song by a player, and transmits the selection to the center server 300. The center server 300 aggregates the information to check if the same game is selected at the same time to send the result to the gaming machine terminal 100. For example, in the case where the same game is already selected at the same time at one gaming machine terminal 100, the center server 300 displays the scenes of the on-going game being implemented on the gaming machine terminal 100 on the display units 106 of the other gaming machine terminals 100. Players can understand the existence of another player who is playing the same game, and share the game with the player.

(i) Ninth Modified Embodiment

Any program for implementing the above-described method on a computer and any computer-readable record medium the program is recorded are within the scope of the present invention. Herein, the program may be a downloadable one. The record medium includes computer-readable/writable flexible disk, a hard disk, a semiconductor memory, a CD-ROM, a DVD, a magneto-optical disc (MO), and the like.

Industrial Applicability

The gaming machine, the gaming method, and the gaming program according to the present invention are applicable to any game that outputs operation instructions to a player.

The invention claimed is:

1. A gaming machine comprising:
a plurality of operation units each being configured to accept an input operation from a player;
an operation sequence storing unit that stores an operation sequence in which a plurality of groups are stored, each of the groups including a plurality of input timings correlated with specific ones of the operation units to be operated for input by the player based on the one or more groups of the input timings, each of the groups of the plurality of input timings being sequential in time series such that the player should perform an input operation using a corresponding one or ones of the operation units based on the input timings correlated with the operation units;
an operation instructing unit that outputs selected groups of the operation instruction to the operation units in accordance with the input timings for input operation, based on the operation sequence;
a change pattern storing unit that stores a plurality of change patterns separate from those in the operation sequence storing unit, each of the change patterns correlating data corresponding to selected input timings with selected operation units;
an evaluation unit that evaluates a game score of the player based on comparison between the input timings and operation timings when the player performed the input operations using the operation units;
an criterion storing unit that stores a criterion for determining a master level of the player;
a master level determining unit that determines a master level of the player based on the criterion; and
an operation sequence changing unit that selects one of the groups of the operation sequence stored in the operation sequence storing unit and replaces that one group with one of the change patterns stored in the change pattern storing unit thereby changing one of the groups of input timings in response to the master level of the player being determined to be equal to or more than a predetermined value by the master level determining unit.

2. The gaming machine according to claim 1, wherein in the part of at least one group of input timings, the operation sequence changing unit changes the operation units that is associated with the group of input timings.

3. The gaming machine according to claim 1, wherein the evaluation unit extracts a mastered pattern of a matching degree that is equal to a predetermined value or more between the operation timings of the operation units by the player and the input timings, based on the game score of the past corresponding to the operation sequence, from the operation sequence, and
the operation sequence changing unit changes at least a part of the mastered pattern.

4. The gaming machine according to claim 1, wherein at least a part of the operation units is arranged in a predetermined direction,
the operation sequence includes a routine sequence that requires for input operations using the operation units along the predetermined direction in time series, and,
in a part of at least one group of the input timings in the routine sequence, the operation sequence changing unit replaces the operation units associated with the group of input timings with operation units arranged in a direction different from the predetermined direction.

5. The gaming machine according to claim 1, wherein the operation sequence changing unit varies the details of a change in the group of input timings, depending on the master level of the player.

6. The gaming machine according to claim 1, wherein the operation sequence changing unit changes the part of the group of input timings after the operation instructions are implemented to a predetermined position of the operation sequence.

7. The gaming machine according to claim 6, wherein the master level determining unit determines whether or not the master level to the predetermined position is equal to or more than a predetermined value.

8. The gaming machine according to claim 6, wherein the operation sequence storing unit stores the predetermined position.

9. The gaming machine according to claim 1, wherein the criterion of the master level is at least one of the number of plays based on the operation sequence, a game score of the past based on the operation sequence, and a current game score at a predetermined time point after the operation instruction starts based on the operation sequence.

10. A gaming method executed by a gaming machine having a plurality of operation units configure to means that each accept an input operation from a player, the method comprising:
- storing an operation sequence in which groups of a plurality of input timings are correlated with corresponding ones of the operation units to be operated for input by the player based on the groups of the input timings, each group setting the plurality of input timings sequentially in time at each of which the player should perform an input operation using a corresponding one or ones of the operation units;
- outputting an operation instruction to corresponding ones of the operation units based upon the input timing of a selected group or groups of the operation sequence such that the player can input input operations, based on the selected group or groups of the operation sequence;
- storing a plurality of change patterns separate from input timing stored in the operation sequence storing unit, each of the change patterns correlating data corresponding to selected input timings with selected operation units;
- evaluating a game score of the player based on comparison between the input timings and operation timings corresponding to the player's performed input operations using the operation units;
- storing a criterion for determining a master level of the player;
- determining a master level of the player based on the criterion; and
- changing at least one group of input timings and operation of corresponding operation units stored in the operation sequence such that one of the groups of the operation sequence is replaced with a group stored in the storing of the plurality of the change patterns in response to the master level of the player being determined to be equal to or more than a predetermined value in the determining of the master level.

11. A gaming program stored on a non-transitory computer-readable storage medium executable by a computer terminal having a plurality of operation units configured to accept an input operation from a player, the program makes the computer terminal to be executed as:
- operation sequence storing unit that stores an operation sequence in which one or more groups of a plurality of input timings are associated with operation units to be operated for input by the player based on the group of the input timings, each group correlating the plurality of input timings sequentially in time with corresponding ones of the operation units such that the player should perform an input operation using the corresponding ones of the operation units;
- operation instructing unit that outputs an operation instruction to the operation units and the input timing for input operation, based on selected groups from the operation sequence;
- evaluation unit that evaluates a game score of the player based on comparison between the input timings and operation timings when the player performed the input operations using the operation units;
- criterion storing unit that stores a criterion for determining a master level of the player;
- master level determining that determines a master level of the player based on the criterion; and
- operation sequence changing unit that selects one of the groups of the operation sequence stored in the operation sequence storing unit and replaces that one group with one of the change patterns stored in the change pattern storing unit thereby changing of the groups of input timings, in response to the master level of the player being determined to be equal to or more than a predetermined value by the master level determining unit.

* * * * *